(12) United States Patent
Ferguson

(10) Patent No.: US 12,354,481 B2
(45) Date of Patent: Jul. 8, 2025

(54) DETERMINING CHANGES IN A DRIVING ENVIRONMENT BASED ON VEHICLE BEHAVIOR

(71) Applicant: WAYMO LLC, Mountain View, CA (US)

(72) Inventor: David Ian Franklin Ferguson, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/414,602

(22) Filed: Jan. 17, 2024

(65) Prior Publication Data

US 2024/0274012 A1   Aug. 15, 2024

Related U.S. Application Data

(63) Continuation of application No. 18/122,434, filed on Mar. 16, 2023, now Pat. No. 11,908,328, which is a continuation of application No. 17/222,291, filed on Apr. 5, 2021, now Pat. No. 11,636,765, which is a continuation of application No. 16/225,651, filed on
(Continued)

(51) Int. Cl.
*G08G 1/16* (2006.01)

(52) U.S. Cl.
CPC .................................. *G08G 1/166* (2013.01)

(58) Field of Classification Search
None
See application file for complete search history.

(56) References Cited

U.S. PATENT DOCUMENTS 1,924,984 A   8/1933   Fageol
3,186,508 A   6/1965   Lamont
(Continued)

FOREIGN PATENT DOCUMENTS

CN   102047076 A   5/2011
EP     0884666 A1  12/1998
(Continued)

OTHER PUBLICATIONS

"Extended European Search Report received for European Patent Application No. 13864358.0, mailed on May 12, 2016", 6 pages.
(Continued)

*Primary Examiner* — Todd Melton
*Assistant Examiner* — Jason R Roberson
(74) *Attorney, Agent, or Firm* — Botos Churchill IP Law

(57) ABSTRACT

A method and apparatus are provided for determining whether a driving environment has changed relative to previously stored information about the driving environment. The apparatus may include an autonomous driving computer system configured to detect one or more vehicles in the driving environment, and determine corresponding trajectories for those detected vehicles. The autonomous driving computer system may then compare the determined trajectories to an expected trajectory of a hypothetical vehicle in the driving environment. Based on the comparison, the autonomous driving computer system may determine whether the driving environment has changed and/or a probability that the driving environment has changed, relative to the previously stored information about the driving environment.

20 Claims, 15 Drawing Sheets

Related U.S. Application Data

Dec. 19, 2018, now Pat. No. 11,011,061, which is a continuation of application No. 15/468,574, filed on Mar. 24, 2017, now Pat. No. 10,192,442, which is a continuation of application No. 13/628,905, filed on Sep. 27, 2012, now Pat. No. 9,633,564.

(56) References Cited

U.S. PATENT DOCUMENTS

| | | | |
|---|---|---|---|
| 3,324,805 A | 6/1967 | Mulch | |
| 3,596,728 A | 8/1971 | Neville | |
| 4,372,414 A | 2/1983 | Anderson et al. | |
| 4,387,783 A | 6/1983 | Carman | |
| 4,656,834 A | 4/1987 | Elpern | |
| 4,924,795 A | 5/1990 | Ottemann | |
| 4,970,653 A | 11/1990 | Kenue | |
| 4,982,072 A | 1/1991 | Takigami | |
| 5,187,666 A | 2/1993 | Watanabe | |
| 5,415,468 A | 5/1995 | Latarnik | |
| 5,448,487 A | 9/1995 | Arai | |
| 5,470,134 A | 11/1995 | Toepfer et al. | |
| 5,684,696 A | 11/1997 | Rao et al. | |
| 5,774,069 A | 6/1998 | Tanaka et al. | |
| 5,790,403 A | 8/1998 | Nakayama | |
| 5,828,968 A | 10/1998 | Iiboshi et al. | |
| 5,906,645 A | 5/1999 | Kagawa et al. | |
| 5,913,376 A | 7/1999 | Takei | |
| 5,926,117 A * | 7/1999 | Gunji | G05D 1/0297 340/991 |
| 6,064,926 A | 5/2000 | Sarangapani et al. | |
| 6,070,682 A | 6/2000 | Isogai et al. | |
| 6,151,539 A | 11/2000 | Bergholz et al. | |
| 6,195,610 B1 | 2/2001 | Kaneko | |
| 6,321,147 B1 | 11/2001 | Takeda et al. | |
| 6,332,354 B1 | 12/2001 | Lalor et al. | |
| 6,343,247 B2 | 1/2002 | Jitsukata et al. | |
| 6,385,539 B1 | 5/2002 | Wilson et al. | |
| 6,438,472 B1 | 8/2002 | Tano et al. | |
| 6,438,491 B1 | 8/2002 | Farmer | |
| 6,470,874 B1 | 10/2002 | Mertes | |
| 6,504,259 B1 | 1/2003 | Kuroda et al. | |
| 6,516,262 B2 | 2/2003 | Takenaga et al. | |
| 6,591,172 B2 | 7/2003 | Oda et al. | |
| 6,643,576 B1 | 11/2003 | O'Connor et al. | |
| 6,832,156 B2 | 12/2004 | Farmer | |
| 6,836,719 B2 | 12/2004 | Andersson et al. | |
| 6,847,869 B2 | 1/2005 | Dewberry et al. | |
| 6,862,524 B1 | 3/2005 | Nagda | |
| 6,876,908 B2 | 4/2005 | Cramer et al. | |
| 6,934,613 B2 | 8/2005 | Yun | |
| 7,011,186 B2 | 3/2006 | Frentz et al. | |
| 7,031,829 B2 | 4/2006 | Nisiyama | |
| 7,102,496 B1 | 9/2006 | Ernst, Jr. et al. | |
| 7,177,760 B2 | 2/2007 | Kudo | |
| 7,194,347 B2 | 3/2007 | Harumoto et al. | |
| 7,207,304 B2 | 4/2007 | Lwatsuki | |
| 7,233,861 B2 | 6/2007 | Van Buer et al. | |
| 7,327,242 B2 | 2/2008 | Holloway et al. | |
| 7,340,332 B2 | 3/2008 | Underdahl et al. | |
| 7,346,439 B2 | 3/2008 | Bodin | |
| 7,394,046 B2 | 7/2008 | Olsson et al. | |
| 7,486,802 B2 | 2/2009 | Hougen | |
| 7,499,774 B2 | 3/2009 | Barrett et al. | |
| 7,499,776 B2 | 3/2009 | Allard et al. | |
| 7,499,804 B2 | 3/2009 | Svendsen et al. | |
| 7,515,101 B1 | 4/2009 | Bhogal et al. | |
| 7,565,241 B2 | 7/2009 | Tauchi | |
| 7,579,942 B2 | 8/2009 | Kalik | |
| 7,656,280 B2 | 2/2010 | Hines et al. | |
| 7,694,555 B2 | 4/2010 | Howell et al. | |
| 7,778,759 B2 | 8/2010 | Tange et al. | |
| 7,818,124 B2 | 10/2010 | Herbst et al. | |
| 7,865,277 B1 | 1/2011 | Larson et al. | |
| 7,894,951 B2 | 2/2011 | Norris et al. | |
| 7,908,040 B2 | 3/2011 | Howard et al. | |
| 7,956,730 B2 | 6/2011 | White et al. | |
| 7,979,175 B2 | 7/2011 | Allard et al. | |
| 8,050,863 B2 | 11/2011 | Trepagnier et al. | |
| 8,078,349 B1 | 12/2011 | Prada Gomez et al. | |
| 8,126,642 B2 | 2/2012 | Trepagnier et al. | |
| 8,190,322 B2 | 5/2012 | Lin et al. | |
| 8,195,341 B2 | 6/2012 | Huang et al. | |
| 8,244,408 B2 | 8/2012 | Lee et al. | |
| 8,260,515 B2 | 9/2012 | Huang et al. | |
| 8,280,601 B2 | 10/2012 | Huang et al. | |
| 8,280,623 B2 | 10/2012 | Trepagnier et al. | |
| 8,352,111 B2 | 1/2013 | Mudalige | |
| 8,352,112 B2 | 1/2013 | Mudalige | |
| 8,412,449 B2 | 4/2013 | Trepagnier et al. | |
| 8,452,506 B2 | 5/2013 | Groult | |
| 8,634,980 B1 | 1/2014 | Urmson et al. | |
| 8,706,394 B2 | 4/2014 | Trepagnier et al. | |
| 8,718,861 B1 | 5/2014 | Montemerlo et al. | |
| 9,321,461 B1 | 4/2016 | Silver et al. | |
| 9,600,768 B1 | 3/2017 | Ferguson | |
| 9,633,564 B2 | 4/2017 | Ferguson | |
| 11,011,061 B2 * | 5/2021 | Ferguson | G01C 21/3819 |
| 11,636,765 B2 | 4/2023 | Ferguson | |
| 2001/0037927 A1 | 11/2001 | Nagler et al. | |
| 2003/0016804 A1 | 1/2003 | Sheha et al. | |
| 2003/0055554 A1 | 3/2003 | Shioda et al. | |
| 2003/0093209 A1 | 5/2003 | Andersson et al. | |
| 2004/0122590 A1 | 6/2004 | Ito et al. | |
| 2004/0243292 A1 | 12/2004 | Roy | |
| 2005/0012589 A1 | 1/2005 | Kokubu et al. | |
| 2005/0125154 A1 | 6/2005 | Kawasaki | |
| 2005/0149251 A1 | 7/2005 | Donath et al. | |
| 2005/0273251 A1 | 12/2005 | Nix et al. | |
| 2006/0037573 A1 | 2/2006 | Iwatsuki et al. | |
| 2006/0082437 A1 | 4/2006 | Yuhara | |
| 2006/0089764 A1 | 4/2006 | Filippov et al. | |
| 2006/0089800 A1 | 4/2006 | Svendsen et al. | |
| 2006/0178240 A1 | 8/2006 | Hansel | |
| 2006/0276942 A1 | 12/2006 | Anderson et al. | |
| 2007/0165910 A1 | 7/2007 | Nagaoka et al. | |
| 2007/0225909 A1 | 9/2007 | Sakano | |
| 2007/0239331 A1 | 10/2007 | Kaplan | |
| 2007/0247281 A1 | 10/2007 | Shimomura | |
| 2008/0021628 A1 | 1/2008 | Tryon | |
| 2008/0039991 A1 | 2/2008 | May et al. | |
| 2008/0059015 A1 | 3/2008 | Whittaker et al. | |
| 2008/0059048 A1 | 3/2008 | Kessler et al. | |
| 2008/0084283 A1 | 4/2008 | Kalik | |
| 2008/0120025 A1 | 5/2008 | Naitou et al. | |
| 2008/0120171 A1 | 5/2008 | Ikeuchi et al. | |
| 2008/0147253 A1 | 6/2008 | Breed | |
| 2008/0161987 A1 | 7/2008 | Breed | |
| 2008/0167771 A1 | 7/2008 | Whittaker et al. | |
| 2008/0183512 A1 | 7/2008 | Benzinger et al. | |
| 2008/0188246 A1 | 8/2008 | Sheha et al. | |
| 2008/0195268 A1 | 8/2008 | Sapilewski et al. | |
| 2008/0277183 A1 | 11/2008 | Huang et al. | |
| 2008/0303696 A1 | 12/2008 | Aso et al. | |
| 2008/0306969 A1 | 12/2008 | Mehta et al. | |
| 2009/0005959 A1 | 1/2009 | Bargman et al. | |
| 2009/0074249 A1 | 3/2009 | Moed et al. | |
| 2009/0082879 A1 | 3/2009 | Dooley et al. | |
| 2009/0115594 A1 | 5/2009 | Han | |
| 2009/0198400 A1 | 8/2009 | Allard et al. | |
| 2009/0248231 A1 | 10/2009 | Kamiya | |
| 2009/0276154 A1 | 11/2009 | Subramanian et al. | |
| 2009/0287367 A1 | 11/2009 | Salinger | |
| 2009/0287368 A1 | 11/2009 | Bonne | |
| 2009/0306834 A1 | 12/2009 | Hjelm et al. | |
| 2009/0319096 A1 | 12/2009 | Offer et al. | |
| 2009/0319112 A1 | 12/2009 | Fregene et al. | |
| 2009/0326799 A1 | 12/2009 | Crook | |
| 2010/0017056 A1 | 1/2010 | Asakura et al. | |
| 2010/0052945 A1 | 3/2010 | Breed | |
| 2010/0066587 A1 | 3/2010 | Yamauchi et al. | |
| 2010/0076640 A1 | 3/2010 | Maekawa et al. | |
| 2010/0079590 A1 | 4/2010 | Kuehnle et al. | |
| 2010/0179720 A1 | 7/2010 | Lin et al. | |
| 2010/0191433 A1 | 7/2010 | Groult | |

(56) References Cited

U.S. PATENT DOCUMENTS

| | | |
|---|---|---|
| 2010/0205132 A1 | 8/2010 | Taguchi et al. |
| 2010/0228419 A1 | 9/2010 | Lee et al. |
| 2010/0241297 A1 | 9/2010 | Aoki et al. |
| 2010/0253542 A1 | 10/2010 | Seder et al. |
| 2010/0256836 A1 | 10/2010 | Mudalige |
| 2011/0066313 A1 | 3/2011 | Larsson et al. |
| 2011/0071718 A1 | 3/2011 | Norris et al. |
| 2011/0137520 A1 | 6/2011 | Rector et al. |
| 2011/0150348 A1 | 6/2011 | Anderson |
| 2011/0206273 A1 | 8/2011 | Plagemann et al. |
| 2011/0213511 A1 | 9/2011 | Visconti et al. |
| 2011/0246156 A1 | 10/2011 | Zecha et al. |
| 2011/0254655 A1 | 10/2011 | Maalouf et al. |
| 2012/0053775 A1 | 3/2012 | Nettleton et al. |
| 2012/0114178 A1 | 5/2012 | Platonov et al. |
| 2012/0157052 A1 | 6/2012 | Quade |
| 2012/0277947 A1 | 11/2012 | Boehringer et al. |
| 2013/0054049 A1 | 2/2013 | Uno |
| 2013/0054106 A1 | 2/2013 | Schmudderich et al. |
| 2013/0179382 A1 | 7/2013 | Fritsch et al. |
| 2014/0088855 A1 | 3/2014 | Ferguson |
| 2014/0257686 A1* | 9/2014 | Feldman ......... B60W 30/18163 701/300 |
| 2015/0166062 A1* | 6/2015 | Johnson ................. G08G 1/167 701/41 |

FOREIGN PATENT DOCUMENTS

| | | | |
|---|---|---|---|
| EP | 2216225 A1 | 8/2010 | |
| JP | H09128039 A | 5/1997 | |
| JP | 09160643 A | 6/1997 | |
| JP | H09183383 A | 7/1997 | |
| JP | 11282530 A | 10/1999 | |
| JP | 2000149188 A | 5/2000 | |
| JP | 2000305625 A | 11/2000 | |
| JP | 2000338008 A | 12/2000 | |
| JP | 2001101599 A | 4/2001 | |
| JP | 2002236993 A | 8/2002 | |
| JP | 2002251690 A | 9/2002 | |
| JP | 2003081039 A | 3/2003 | |
| JP | 2003162799 A | 6/2003 | |
| JP | 2005067483 A | 3/2005 | |
| JP | 2005071114 A | 3/2005 | |
| JP | 2005165421 A | 6/2005 | |
| JP | 2005339181 A | 12/2005 | |
| JP | 2006322752 A | 11/2006 | |
| JP | 2007001475 A | 1/2007 | |
| JP | 2008117082 A | 5/2008 | |
| JP | 2008152655 A | 7/2008 | |
| JP | 2008170404 A | 7/2008 | |
| JP | 2008290680 A | 12/2008 | |
| JP | 2009053925 A | 3/2009 | |
| WO | 0070941 A1 | 11/2000 | |
| WO | 2001088827 A1 | 11/2001 | |
| WO | 2009028558 A1 | 3/2009 | |
| WO | 2009155228 A1 | 12/2009 | |
| WO | 2011021046 A1 | 2/2011 | |
| WO | 2012047977 A2 | 4/2012 | |

OTHER PUBLICATIONS

"Fact Sheet: Beyond Traffic Signals: A Paradigm Shift Intersection Control For Autonomous Vehicles", Available online at: <http://www.fhwa.dot.gov/advancedresearch/pubs/10023/index.cfm>, Accessed on Apr. 27, 2011, 3 pages.

"International Search Report and Written Opinion received for PCT Patent Application No. PCT/US2011/054154, mailed on Apr. 24, 2012", 9 pages.

"International Search Report and Written Opinion received for PCT Patent Application No. PCT/US2011/054896, mailed on Apr. 25, 2012", 8 pages.

"International Search Report and Written Opinion received for PCT Patent Application No. PCT/US2011/054899, mailed on May 4, 2012", 8 pages.

"International Search Report and Written Opinion received for PCT Patent Application No. PCT/US2013/061604, mailed on Jul. 3, 2014", 10 pages.

"Office Action received for Chinese Patent Application No. 201380061357.4, mailed on Nov. 8, 2016", 8 pages.

"Office Action received for Korean Patent Application No. 10-2015-7010981, mailed on Sep. 14, 2017", 8 pages (5 pages of English Translation and 3 pages of Official Copy).

Crane, et al., "Team Gator Nation's Autonomous Vehicle Development For The 2007 DARPA Urban Challenge", Journal of Aerospace Computing, Information and communication, vol. 4, Dec. 2007, pp. 1059-1085.

Di Leece, et al., "Experimental System To Support Real-Time Driving Pattern Recognition", Advanced Intelligent Computing Theories and Applications, With Aspects of Artificial Intelligence, ICIC 2008, Lecture Notes in Computer Science, vol. 5227, Springer, Berlin, 2008, pp. 1192-1199.

Guizzo, "How's Google's Self-Driving Car Works", Available online at: <http://spectrum.ieee.org/automaton/robotics/artificial-intelligence/how-google-self-driving-car-works>, IEEE, Oct. 18, 2011, pp. 1-31.

Jaffe, "The First Look at How Google's Self-Driving Car Handles City Streets", The Atlantic City Lab, Apr. 28, 2014, 15 pages.

Markoff, "Google Cars Drive Themselves, in Traffic", Available online at: <http://www.nytimes.com/2010/10/1O/science/10google.html>, Oct. 9, 2010, 4 pages.

Mcnaughton, et al., "Motion Planning for Autonomous Driving with a Conformal Spatiotemporal Lattice", IEEE, International Conference on Robotics and Automation, May 9-13, 2011, pp. 4889-4895.

Schonhof, et al., "Autonomous Detection And Anticipation of Jam Fronts From Messages Propagated By Intervehicle Communication", Journal of the Transportation Research Board, vol. 1999, No. 1, Jan. 1, 2007, pp. 3-12.

* cited by examiner

DETERMINING CHANGES IN A DRIVING ENVIRONMENT BASED ON VEHICLE BEHAVIOR

CROSS-REFERENCE TO RELATED APPLICATIONS

The present application is a continuation of U.S. patent application Ser. No. 18/122,434, filed Mar. 16, 2023, which is a continuation of U.S. patent application Ser. No. 17/222,291, filed Apr. 5, 2021, now U.S. Pat. No. 11,636,765, which is a continuation of U.S. patent application Ser. No. 16/225,651, filed Dec. 19, 2018, now U.S. Pat. No. 11,011,061, which is a continuation of U.S. patent application Ser. No. 15/468,574, filed on Mar. 24, 2017, now U.S. Pat. No. 10,192,442, which is a continuation of U.S. patent application Ser. No. 13/628,905, filed on Sep. 27, 2012, now U.S. Pat. No. 9,633,564, the disclosures of which are incorporated herein by reference.

BACKGROUND

An autonomous vehicle may use various computing systems to aid in the transport of passengers from one location to another. In addition, the autonomous vehicle may require an initial input or continuous input from an operator, such as a pilot, driver, or passenger. Other autonomous systems, for example autopilot systems, may be used only when the system has been engaged, which permits the operator to switch from a manual mode (where the operator exercises a high degree of control over the movement of the autonomous vehicle) to an autonomous mode (where the autonomous vehicle essentially drives itself) to modes that lie somewhere in between.

The autonomous vehicle may be equipped with various types of sensors in order to detect objects in its environment. For example, the autonomous vehicles may include such sensors as lasers, sonar, radar, cameras, and other sensors that scan and record data from the autonomous vehicle's environment. Sensor data from one or more of these sensors may be used to detect objects and their respective characteristics (position, shape, heading, speed, etc.). This detection and identification is a critical function for the safe operation of the autonomous vehicle.

To navigate an environment confidently and precisely, the autonomous vehicle may rely on a prior stored electronic representation of the environment (e.g., a roadway, a highway, etc.). The electronic representation of the environment may be considered a "map" that identifies such features as lane markings, lane edges, k-rail concrete barriers, lane dividers, road medians, traffic safety cones, and other such features. The autonomous vehicle may store the map for both complex and simple environments.

However, there are times in which these prior stored maps may be out-of-date or inaccurate. For example, there may be construction in the environment or an accident occurs on a roadway. As a result, the lanes of the roadway may be shifted relative to their previously indicated position in the prior stored map. In such circumstances, the autonomous vehicle must be able to identify when these changes in the roadway occur.

BRIEF SUMMARY

An apparatus and method are disclosed. In one embodiment, the apparatus includes a sensor configured to detect a first vehicle in a driving environment and a computer-readable memory that stores detailed map information for a driving environment, the detailed map information comprising information about a road on which the first vehicle travels, and first state information for the first vehicle, the first state information identifying at least one of position, speed, or direction of travel for the first vehicle. The apparatus may also include a processor in communication with the computer-readable memory and the sensor. The processor may be configured to receive sensor information from the sensor, the sensor information based on having detected the first vehicle in the driving environment, determine the first state information based on the received sensor information, determine a first trajectory based on the first state information, determine an expected trajectory based on the detailed map information, and determine that the driving environment has changed by comparing the determined expected trajectory with the determined first trajectory.

In another embodiment of the apparatus, the processor is further configured to determine a deviation metric value by comparing the determined expected trajectory with the determined first trajectory, wherein the processor determines that the driving environment has changed when the deviation metric value exceeds a deviation metric threshold.

In a further embodiment of the apparatus, the determined deviation metric value comprises a maximum deviation metric value representing a maximum difference between the determined first trajectory and the determined expected trajectory.

In yet another embodiment of the apparatus, the determined deviation metric value comprises an average signed deviation metric value, the average signed deviation metric value representing a magnitude and direction of a difference between the determined first trajectory and the determined expected trajectory.

In yet a further embodiment of the apparatus, the determined first trajectory comprises an average trajectory, the average trajectory having been averaged over a predetermined time period.

In another embodiment of the apparatus, the determined expected trajectory is based on a centerline of the road corresponding to the detailed map information.

In a further embodiment of the apparatus, the computer-readable memory further stores a probability model that defines a probability that the driving environment has changed relative to the detailed map information based on at least one deviation metric value determined from the comparison of the determined first trajectory with the determined expected trajectory, and a probability function that determines the probability that the driving environment has changed relative to the detailed map information based on the probability model. In addition, the processor may be further configured to determine the probability that the driving environment has changed relative to the detailed map information based on the probability function.

In yet another embodiment of the apparatus, the probability model is one of a plurality of probability models, and the processor may be further configured to select the probability model from the plurality of probability models based on a first geographic location.

In yet a further embodiment of the apparatus, the determined first trajectory comprises a plurality of trajectories, each of the trajectories of the plurality of trajectories corresponding to a vehicle in the driving environment, and the processor may be further configured to consolidate the plurality of trajectories as the determined first trajectory based on at least one consolidation factor.

In another embodiment of the apparatus, the processor may be further configured to determine a consolidated trajectory quality value for the plurality of trajectories, the consolidated trajectory quality value representing a quality of the determined first trajectory, determine the probability that the driving environment has changed relative to the detailed map information based on the determined consolidated trajectory quality value.

In one embodiment of the method, the method may include detecting, with a sensor of an autonomous vehicle, a first vehicle in a driving environment, and receiving, with a processor in communication with the sensor, sensor information based on having detected the first vehicle in the driving environment. The method may also include determining, with the processor, the first state information based on the received sensor information, the first state information identifying at least one of position, speed, or direction of travel for the first vehicle. The method may further include determining, with the processor, a first trajectory based on the first state information, and determining, with the processor, an expected trajectory based on detailed map information, the detailed map information comprising information about the driving environment in which the first vehicle travels. The method may also include determining, with the processor, that the driving environment has changed by comparing the determined expected trajectory with the determined first trajectory.

In another embodiment of the method, the method may include determining, with the processor, a deviation metric value by comparing the determined expected trajectory with the determined first trajectory, and determining, with the processor, that the driving environment has changed when the deviation metric value exceeds a deviation metric threshold.

In a further embodiment of the method, the determined deviation metric value comprises a maximum deviation metric value representing a maximum difference between the determined first trajectory and the determined expected trajectory.

In yet another embodiment of the method, the determined deviation metric value comprises an average signed deviation metric value, the average signed deviation metric value representing a magnitude and direction of a difference between the determined first trajectory and the determined expected trajectory.

In yet a further embodiment of the method, the determined first trajectory comprises an average trajectory, the average trajectory having been averaged over a predetermined time period.

In another embodiment of the method, the determined expected trajectory is based on a centerline of the road corresponding to the detailed map information.

In a further embodiment of the method, the method includes determining, with the processor, a probability that the driving environment has changed relative to the detailed map information based on a probability function, wherein the probability function determines the probability that the driving environment has changed relative to the detailed map information based on a probability model, and the probability model defines a probability that the driving environment has changed relative to the detailed map information based on at least one deviation metric value determined from the comparison of the determined first trajectory with the determined expected trajectory.

In yet another embodiment of the method, the probability model is one of a plurality of probability models and the method further includes selecting, with the processor, the probability model from the plurality of probability models based on a first geographic location.

In yet a further embodiment of the method, the determined first trajectory comprises a plurality of trajectories, each of the trajectories of the plurality of trajectories corresponding to a vehicle in the driving environment. The method may also include consolidating, with the processor, the plurality of trajectories as the determined first trajectory based on at least one consolidation factor.

In another embodiment of the method, the method ay include determining, with the processor, a consolidated trajectory quality value for the plurality of trajectories, the consolidated trajectory quality value representing a quality of the determined first trajectory, and determining, with the processor, the probability that the driving environment has changed relative to the detailed map information based on the determined consolidated trajectory quality value.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

This disclosure provides for systems and methods for determining when a previously stored map is inaccurate. In particular, this disclosure provides for an autonomous vehicle that evaluates the behavior of one or more detected vehicles in a driving environment (e.g., a road, a highway, a parkway, a street, etc.) to determine when, or if, the map of the driving environment stored by the autonomous vehicle is accurate.

In one embodiment, the autonomous vehicle may monitor and track the location of one or more vehicles in the driving environment and determine trajectories for the one or more vehicles. Using a map discrepancy algorithm, the autonomous vehicle may then compare the determined vehicle trajectories to expected vehicle trajectories based on identified lanes in the previously stored map. When the autonomous vehicle observes that one or more vehicles are consistently moving in a manner that does not match the expected behavior based on the previously stored map, the autonomous vehicle may identify that the map is no longer reliable (i.e., inaccurate).

For example, in a construction zone, the lanes in the driving environment may be shifted to accommodate the construction work. In this example, traffic may be shifted right or left based on newly established temporary lanes and the trajectories for the various vehicles may no longer follow the previous lanes of the driving environment (i.e., the lanes stored in the map of the autonomous vehicle). When the autonomous vehicle observes and identifies that the traffic has shifted (e.g., by monitoring a consistent change in vehicle trajectories), the autonomous vehicle may conclude that the previously stored map is inaccurate. When the autonomous vehicle identifies that the previously stored map is inaccurate, the autonomous vehicle may stop relying on its previously stored map information. Instead, the autonomous vehicle may rely on another mechanism for maneuvering through the changed driving environment, such as by retrieving a map from a map provider server or requesting that a passenger in the autonomous vehicle take control.

Figure 1:
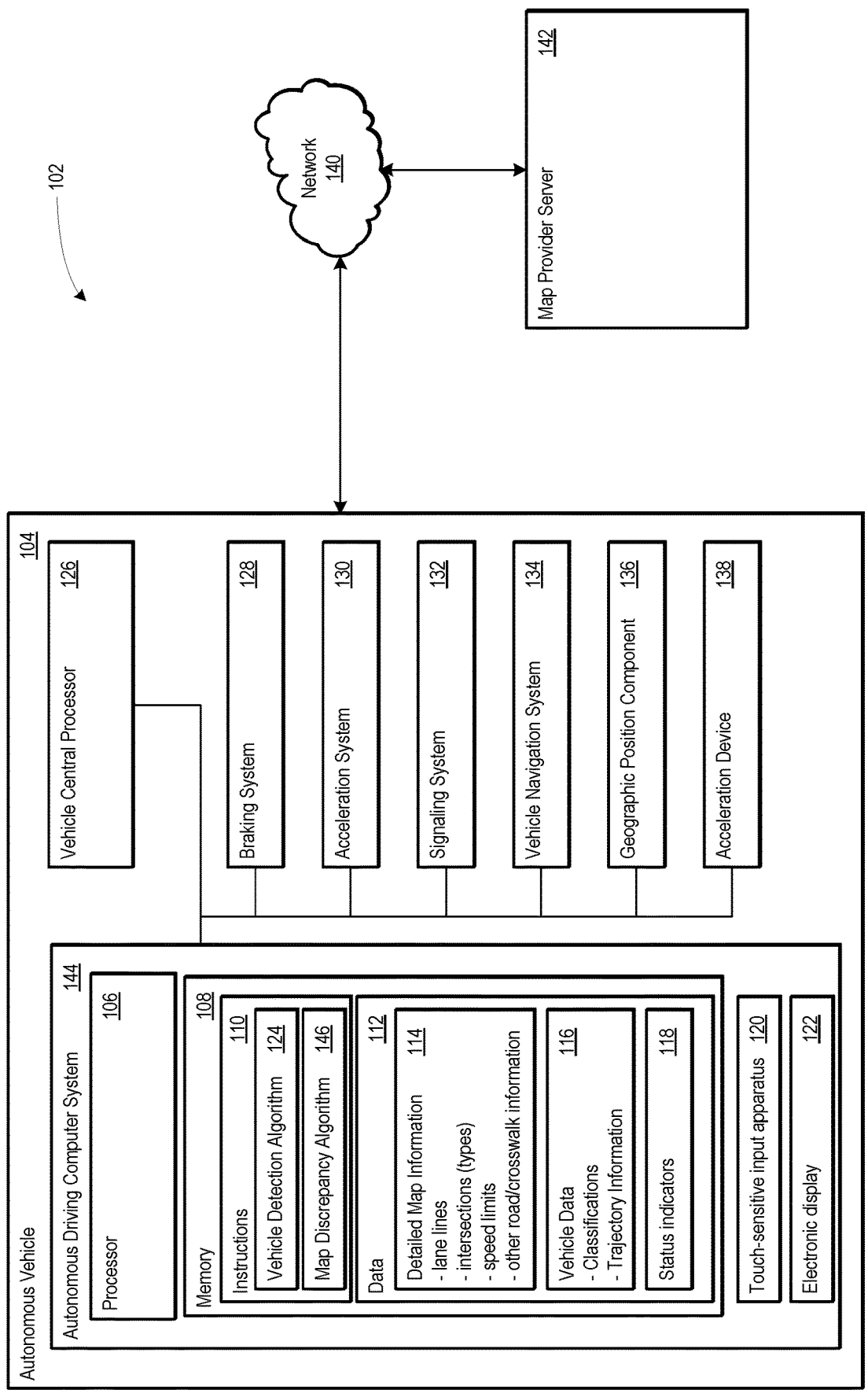
FIG. 1 illustrates an example of an autonomous vehicle for determining whether a driving environment has changed based on tracking one or more vehicles according to aspects of the disclosure.

FIG. 1 illustrates an apparatus 102 for determining whether a driving environment has changed based on the determined trajectories of detected vehicles. In one embodiment, the apparatus may include an autonomous vehicle 104. The autonomous vehicle 104 may be configured to operate autonomously, e.g., drive without the assistance of a human driver. Moreover, the autonomous vehicle 104 may be configured to detect various vehicles and determine the trajectories of the detected vehicles while the autonomous vehicle 104 is operating autonomously.

While certain aspects of the disclosure are particularly useful in connection with specific types of vehicles, the autonomous vehicle 104 may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys.

In one embodiment, the autonomous driving computer system 144 may include a processor 106 and a memory 108. The autonomous driving computer system 144 may also include other components typically present in a general purpose computer.

The memory 108 may store information accessible by the processor 106, such as instructions 110 and data 112 that may be executed or otherwise used by the processor 106. The memory 108 may be of any type of memory operative to store information accessible by the processor 106, including a computer-readable medium, or other medium that stores data that may be read with the aid of an electronic device. Examples of the memory 108 include, but are not limited, a hard-drive, a memory card, read-only memory ("ROM"), random-access memory ("RAM"), digital video disc ("DVD"), or other optical disks, as well as other write-capable and read-only memories. Systems and methods may include different combinations of the foregoing, whereby different portions of the instructions and data are stored on different types of media.

The instructions 110 may be any set of instructions that may be executed directly (such as machine code) or indirectly (such as scripts) by the processor 106. For example, the instructions 110 may be stored as computer code on the computer-readable medium. In that regard, the terms "instructions" and "programs" may be used interchangeably herein. The instructions 110 may be stored in object code format for direct processing by the processor 106, or in any other computer language including scripts or collections of independent source code modules that are interpreted on demand or compiled in advance. Functions, methods and routines of the instructions 110 are explained in more detail below.

The data 112 may be retrieved, stored, or modified by processor 106 in accordance with the instructions 110. For instance, although the disclosed embodiments not limited by any particular data structure, the data 112 may be stored in computer registers, in a relational database as a table having a plurality of different fields and records, XML documents, flat files, or in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 112 may comprise any information sufficient to identify the relevant information, such as numbers, descriptive text, proprietary codes, references to data stored in other areas of the same memory or different memories (including other network locations) or information that is used by a function to calculate the relevant data.

The processor 106 may be any conventional processor, including Reduced Instruction Set Computing ("RISC") processors, Complex Instruction Set Computing ("CISC") processors, or combinations of the foregoing. Alternatively, the processor may be a dedicated device such as an applicant-specific integrated circuit ("ASIC").

Although FIG. 1 functionally illustrates the processor 106, the memory 108, and other elements of the autonomous driving computer system 144 as being within the same block, it will be understood by those of ordinary skill in the art that the processor 106 and the memory 108 may actually comprise multiple processors and memories that may or may not be stored within the same physical housing. For example, the memory 108 may be a hard drive or other storage media located in a housing different from that of the autonomous driving computer system 144.

Accordingly, references to a processor or computer will be understood to include references to a collection of processors or computers or memories that may or may not operate in parallel. Rather than using a single processor to perform the acts described herein, some of the components, such as steering components and deceleration components, may each have their own processor that only performs calculations related to the component's specific function.

In various embodiments described herein, the processor 106 may be located remote from the autonomous vehicle 104 and may communicate with the autonomous vehicle 10 wirelessly. In other aspects, some of the processes described herein are executed on a processor disposed within the autonomous vehicle 104 and others by a remote processor, including taking the acts necessary to execute a single maneuver.

The autonomous driving computer system 144 may include all of the components normally used in connection with a computer, such as a central processing unit (CPU), a memory (e.g., RAM and internal hard drives) storing data 112 and instructions such as an Internet browser or other software application, an electronic display 122 (e.g., a monitor having a screen, a small liquid crystal display ("LCD") touch-screen or any other electrical device that is operable to display information), one or more user input devices (e.g., a mouse, keyboard, touch screen and/or microphone), as well as various sensors (e.g., a video camera) for gathering the explicit (e.g., a gesture) or implicit (e.g., "the person is asleep") information about the states and desires of a person.

The vehicle may also include a geographic position component 136 in communication with the autonomous driving computer system 144 for determining the geographic location of the autonomous vehicle 104. For example, the geographic position component 136 may include a Global Positioning System ("GPS") receiver to determine the autonomous vehicle's 104 latitude, longitude and/or altitude position. Other location systems such as laser-based localization systems, inertial-aided GPS, or camera-based localization may also be used to identify the location of the vehicle. The location of the autonomous vehicle 104 may include an absolute geographical location, such as latitude, longitude, and altitude as well as relative location information, such as location relative to other vehicles immediately around it, which may be determined with less noise than absolute geographical location.

The geographic position component 136 may also include other devices in communication with the autonomous driving computer system 144, such as an accelerometer, gyroscope or another direction/speed detection device 138 to determine the direction and speed of the vehicle or changes thereto. By way of example only, the geographic position component 136 may determine its pitch, yaw or roll (or changes thereto) relative to the direction of gravity or a plane perpendicular thereto. The geographic position component 136 may also track increases or decreases in speed and the direction of such changes. The location and orientation data as set forth herein may be provided automatically to the user, the autonomous driving computer 144, the vehicle central processor 126, other computers and combinations of the foregoing.

The autonomous driving computer system 144 may control the direction and speed of the autonomous vehicle 104 by controlling various components. By way of example, if the autonomous vehicle 104 is operating in a completely autonomous mode, the autonomous driving computer system 144 may cause the autonomous vehicle 104 to accelerate via the acceleration system 130 (e.g., by increasing fuel or other energy provided to the engine), decelerate via the braking system 128 (e.g., by decreasing the fuel supplied to the engine or by applying brakes) and change direction (e.g., by turning the front two wheels). The autonomous driving computer system 144 may also control one or more systems, such as the signaling system 130, when controlling the acceleration system 130 and/or the braking system 128.

The autonomous driving computer system 144 may also control one or more status indicators 118, which may convey the status of the autonomous vehicle 104 and its components to a passenger. For example, the autonomous vehicle 104 may be equipped with an electronic display 122 for displaying information relating to the overall status of the vehicle, particular sensors, or information about or from the autonomous driving computer system 144. The electronic display 122 may display computer-generated images of the vehicle's surroundings including, for example, the status of the autonomous driving computer system 144, the autonomous vehicle 104 itself, roadways, intersections, as well as other objects and information.

The autonomous driving computer system 144 may use visual or audible cues to indicate whether it is obtaining valid data from one or more sensors, whether the it is partially or completely controlling the direction or speed of the autonomous vehicle 104 or both, such as whether there are any errors, etc. In addition, the autonomous driving computer system 144 may also have external indicators which indicate whether, at the moment, a human or an automated system is in control of the vehicle, that are readable by humans, other computers, or both.

The autonomous driving computer system 144 may also communicate with other components of the autonomous vehicle 104. For example, autonomous driving computer system 144 may communicate with a vehicle central processor 126. The autonomous driving computer system 144 may also send and receive information from the various systems of the autonomous vehicle 104. Communicating with the various systems may include communicating with the braking system 128, the acceleration system 130, the signaling system 132, and the vehicle navigation system 134. Communications with these systems may facilitate the control of the movement, speed, etc. of the autonomous vehicle 104. In addition, when engaged, autonomous driving computer system 144 may control some or all of these functions of the autonomous vehicle 104 and thus be fully or partially autonomous. It will be understood that although various systems and the autonomous driving computer system 144 are shown within the autonomous vehicle 104, these systems and components may be external to the autonomous vehicle 104 or physically separated by large distances.

The autonomous vehicle 104 may include components for detecting objects external to it, such as other vehicles, obstacles in the roadway, traffic signals, signs, trees, etc. The detection system may include lasers, sonar, radar, cameras or any other detection devices. For example, where the autonomous vehicle 104 is a small passenger car, the small passenger car may include a laser mounted on the roof or other convenient location. In one aspect, the laser may measure the distance between the autonomous vehicle 104 and the object surfaces facing the autonomous vehicle 104 by spinning on its axis and changing its pitch. The autonomous vehicle 104 may also include various radar detection units, such as those used for adaptive cruise control systems. The radar detection units may be located on the front and back of the car as well as on either side of the front bumper. In another example, a variety of cameras may be mounted on the autonomous vehicle 104 at known distances from one another. In this manner, the parallax from the different images may be used to compute the distance to various objects captured by the one or more cameras. These sensors may assist the vehicle in responding to its environment to maximize safety for passengers as well as objects or people in the environment.

In addition to the sensors described above, the autonomous driving computer system 144 may also use input from sensors found in non-autonomous vehicles. As examples, these sensors may include tire pressure sensors, engine temperature sensors, brake heat sensors, break pad status, tire tread sensors, fuel sensors, oil level and quality sensors, air quality sensors (for detecting temperature, humidity, or particulates in the air), etc.

The data provided by these sensors may be processed by the autonomous driving computer system 144 in real-time. In this context, the sensors may continuously update their output to reflect the environment being sensed at or over a range of time, and continuously or as demanded. The sensors may provide the updated output to the autonomous driving computer system 144 so that it can determine whether the autonomous vehicle's 104 then-current direction or speed should be modified in response to the sensed environment.

The autonomous vehicle 104 may also include persistent data for detecting vehicles and determining the trajectories of the detected vehicles using one or more of the sensors described above. For example, the data 112 may include detailed map information 114 that defines one or more driving environments. The detailed map information 114 may include various maps that identify the shape and elevation of roadways, lane lines, intersections, crosswalks, speed limits, traffic signals, buildings, signs, real time traffic information, or other such objects and information. The detailed map information 114 may further include explicit speed limit information associated with various roadway segments. The speed limit data may be entered manually or scanned from previously taken images of a speed limit sign using, for example, optical-character recognition. In addition, the detailed map information 114 may include three-dimensional terrain maps incorporating one or more of the objects (e.g., crosswalks, intersections, lane lines, etc.) listed above.

The detailed map information 136 may also include lane marker information identifying the location, elevation, and shape of lane markers. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line.

To determine the trajectories of detected vehicles, the autonomous driving computer system 144 may monitor vehicles in a driving environment corresponding to the detailed map information 114. For example, the autonomous driving computer system 144 may detect and track vehicles at an intersection, on the various types of roadways, and in other such driving environments. As another example, the autonomous driving computer system 144 may detect and track vehicles entering and/or exiting a highway, such as vehicles entering the highway via an on-ramp, exiting the highway via an off-ramp and other such behaviors. The autonomous driving computer system 144 may collect, process, and store this information as part of the vehicle data 116.

In addition, the autonomous driving computer system 144 may refer to the detailed map information 114 to determine the various vehicle trajectories. More specifically, the autonomous driving computer system 144 may cross-reference the position of a detected vehicle with a location in the detailed map information 114. Based on this cross-reference, the autonomous driving computer system 144 may then determine the trajectory that a detected vehicle takes based on its detected position. For example, where the autonomous driving computer system 144 detects vehicle on a highway, such as a motorcycle, light trunk, or other vehicle, the autonomous driving computer system 144 may cross-reference the position of the detected vehicle and determine the trajectory of the detected vehicle, such as by tracking the positions of the vehicle as it continues along the highway. The positions recorded by the autonomous driving computer system 144 may be stored as part of the vehicle data 116 and may be used in determining the trajectory of the detected vehicle.

In monitoring vehicles in various driving environments, the data 112 may include vehicle data 116 that defines one or more parameters for classifying a vehicle. Classifications of vehicle may include such classifications as "passenger car," "bicycle," "motorcycle," and other such classifications. The parameters defined by the vehicle data 116 may inform the autonomous driving computer system 144 as to the type of vehicle detected by a given sensor. For example, the vehicle data 116 may include parameters that define the type of vehicle when the vehicle is detected by one or more of the camera sensors, one or more of the laser sensors, and so forth.

Vehicles may be identified through a vehicle detection algorithm 124, which the processor 106 may use to classify vehicles based on various characteristics, such as the size of the vehicle (bicycles are larger than a breadbox and smaller than a car), the speed of the vehicle (bicycles do not tend to go faster than 40 miles per hour or slower than 0.1 miles per hour), and other such characteristics. In addition, the vehicle may be classified based on specific attributes of the vehicle, such as information contained on a license plate, bumper sticker, or logos that appear on the vehicle.

The vehicle data 116 may also include state, positional, and/or trajectory information collected by the autonomous driving computer system 144 when a vehicle is detected. The autonomous driving computer system 144 may collect the state and/or positional information about a detected vehicle to assist in the determination of the vehicle trajectory. The vehicle trajectory for the detected vehicle may define the direction and speed that a vehicle has when in a given driving environment. The vehicle trajectory may also define the past positions, directions, and speed that the detected vehicle had while in the driving environment. As discussed below, the vehicle trajectory for a detected vehicle may be derived from state information that the autonomous driving computer system 144 records.

State information may include characteristics about the detected vehicle. Examples of state information include, but are not limited to, the detected vehicle's speed, the path traveled by the vehicle, the driving environment in which the vehicle is traveling, any directional or orientation changes by the vehicle, or other such state information. The state information may also be associated with one or more segments of the detailed map information 114 to further refine the state of the detected vehicle. For example, where the detected vehicle is detected as being on a highway (as defined by the detailed map information 114), the collected state information may identify that the detected vehicle was traveling in a highway, and may further identify the direction of the detected vehicle, various positional information or changes about the detected vehicle (e.g., the original starting lane of the detected vehicle, the ending lane of the detected vehicle), and other such state information.

The state information collected by the autonomous driving computer system 144 may be used to determine a trajectory for the detected vehicle. As discussed previously, based on the detected positions and speed of the detected vehicle, the autonomous driving computer system 144 may derive a trajectory for the detected vehicle. As discussed below, this determined vehicle trajectory may be compared against an expected vehicle trajectory (which may be stored as part of, or derived from, the detailed map information 114) to determine whether the driving environment has changed. In one embodiment, the instructions 110 may include a map discrepancy algorithm 146 that facilitates the determination by the autonomous driving computer system 144 as to whether the driving environment has changed.

The autonomous vehicle 104 may collect state information about detected vehicles regardless of whether the autonomous vehicle 104 is operating in an autonomous mode or a non-autonomous mode. Thus, whether the autonomous vehicle 104 is operating by itself or has a driver, the autonomous vehicle 104 may collect state and object information to determine the aforementioned vehicle trajectories.

The autonomous vehicle 104 may also communicate with a map provider server 142 via a network 140. The network 140 may be implemented as any combination or type of networks. As examples, the network 140 may be one or more of a Wide Area Network ("WAN"), such as the Internet; a Local Area Network ("LAN"); a Personal Area Network ("PAN"), or a combination of WANs, LANs, and PANs. Moreover, the network 140 may involve the use of one or more wired protocols, such as the Simple Object Access Protocol ("SOAP"); wireless protocols, such as 802.11a/b/g/n, Bluetooth, or WiMAX; transport protocols, such as TCP or UDP; an Internet layer protocol, such as IP; application-level protocols, such as HTTP, a combination of any of the aforementioned protocols, or any other type of protocol.

The autonomous vehicle 104 may communicate with the map provider server 142 to obtain a map of a driving environment. For example, the autonomous vehicle 104 may request a map of the driving environment from the map provider server 142 when the autonomous vehicle 104 determines that the previously stored map (e.g., the detailed map information 114) is inaccurate. The map received from the map provider server 142 may be an up-to-date map of the driving environment that includes the changes to the driving environment detected by the autonomous vehicle 104. In addition, the received map may replace a portion of the detailed map information 114, such as a predetermined geographic area near or surrounding the driving environment (e.g., a two square mile region or other similar area). By requesting a replacement portion of the detailed map information 114 from the map provider server 142, rather than a complete replacement of the detailed map information 114, the autonomous vehicle 114 saves network bandwidth and transfer time.

In one embodiment, the map provider server 142 may comprise a plurality of computers, e.g., a load balancing server farm, that exchange information with different nodes of a network for the purpose of receiving, processing and transmitting data, including the detailed map information 114 and/or vehicle data 116, from the autonomous driving computer system 144. The map provider server 142 may be configured similarly to the autonomous driving computer system 144 (i.e., having a processor 106, a memory 108, instructions 110, and data 112).

Figure 2:
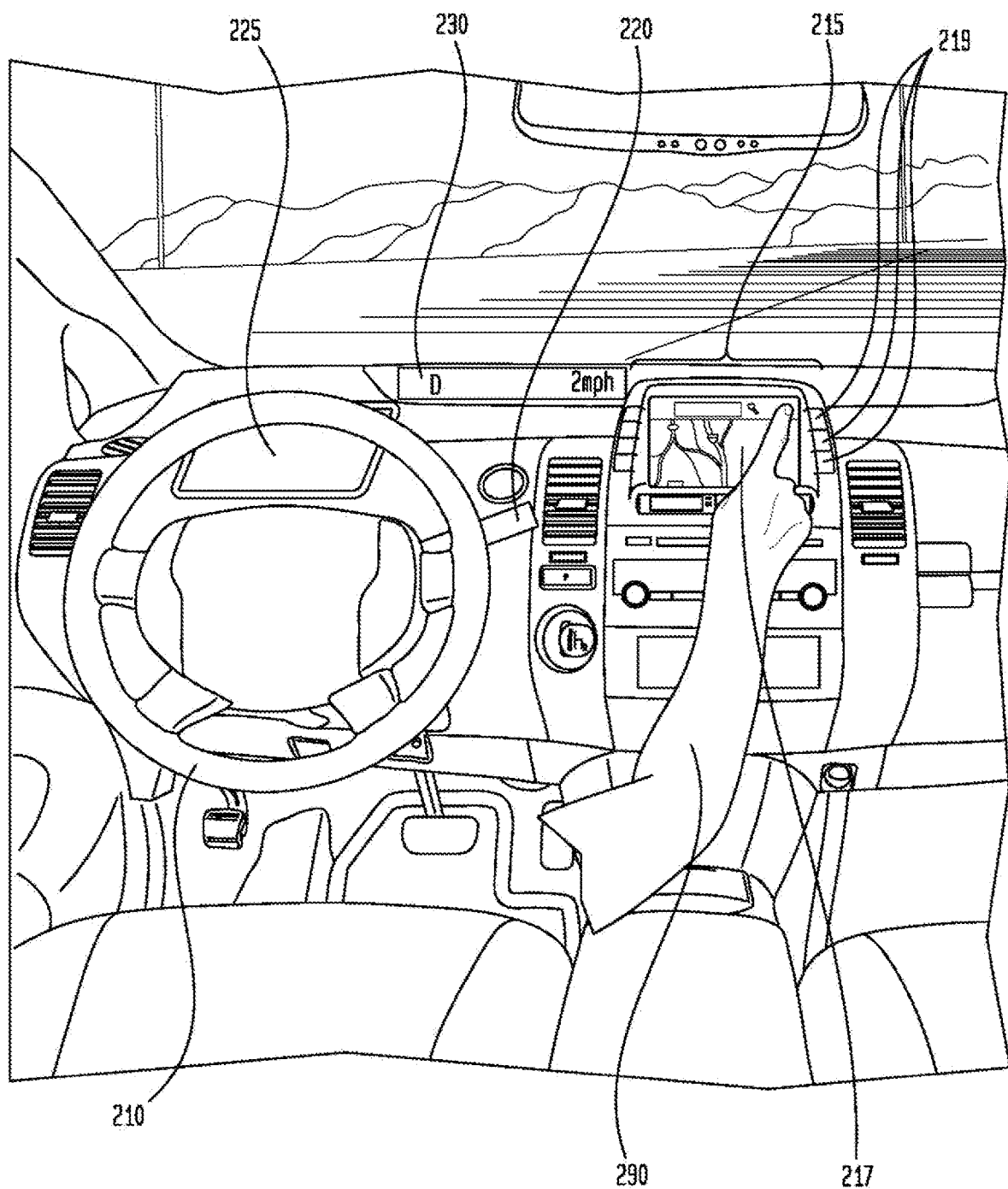
FIG. 2 illustrates an example of an interior of the autonomous vehicle according to aspects of the disclosure

FIG. 2 illustrates an example of an interior of the autonomous vehicle 104 according to aspects of the disclosure. The autonomous vehicle 104 may include all of the features of a non-autonomous vehicle, for example: a steering apparatus, such as steering wheel 210; a navigation display apparatus, such as navigation display 215; and a gear selector apparatus, such as gear shifter 220. The vehicle 104 may also have various user input devices, such as gear shifter 220, touch screen 217, or button inputs 219, for activating or deactivating one or more autonomous driving modes and for enabling a driver or passenger 290 to provide information, such as a navigation destination, to the autonomous driving computer 106.

The autonomous vehicle 104 may also include one or more additional displays. For example, the autonomous vehicle 104 may include a display 225 for displaying information regarding the status of the autonomous vehicle 104 or its computer. In another example, the autonomous vehicle 104 may include a status indicating apparatus such as status bar 230, to indicate the current status of vehicle 104. In the example of FIG. 2, the status bar 230 displays "D" and "2 mph" indicating that the autonomous vehicle 104 is presently in drive mode and is moving at 2 miles per hour. In that regard, the autonomous vehicle 104 may display text on an electronic display, illuminate portions of the autonomous vehicle 104, such as the steering wheel 210, or provide various other types of indications.

Figure 3:
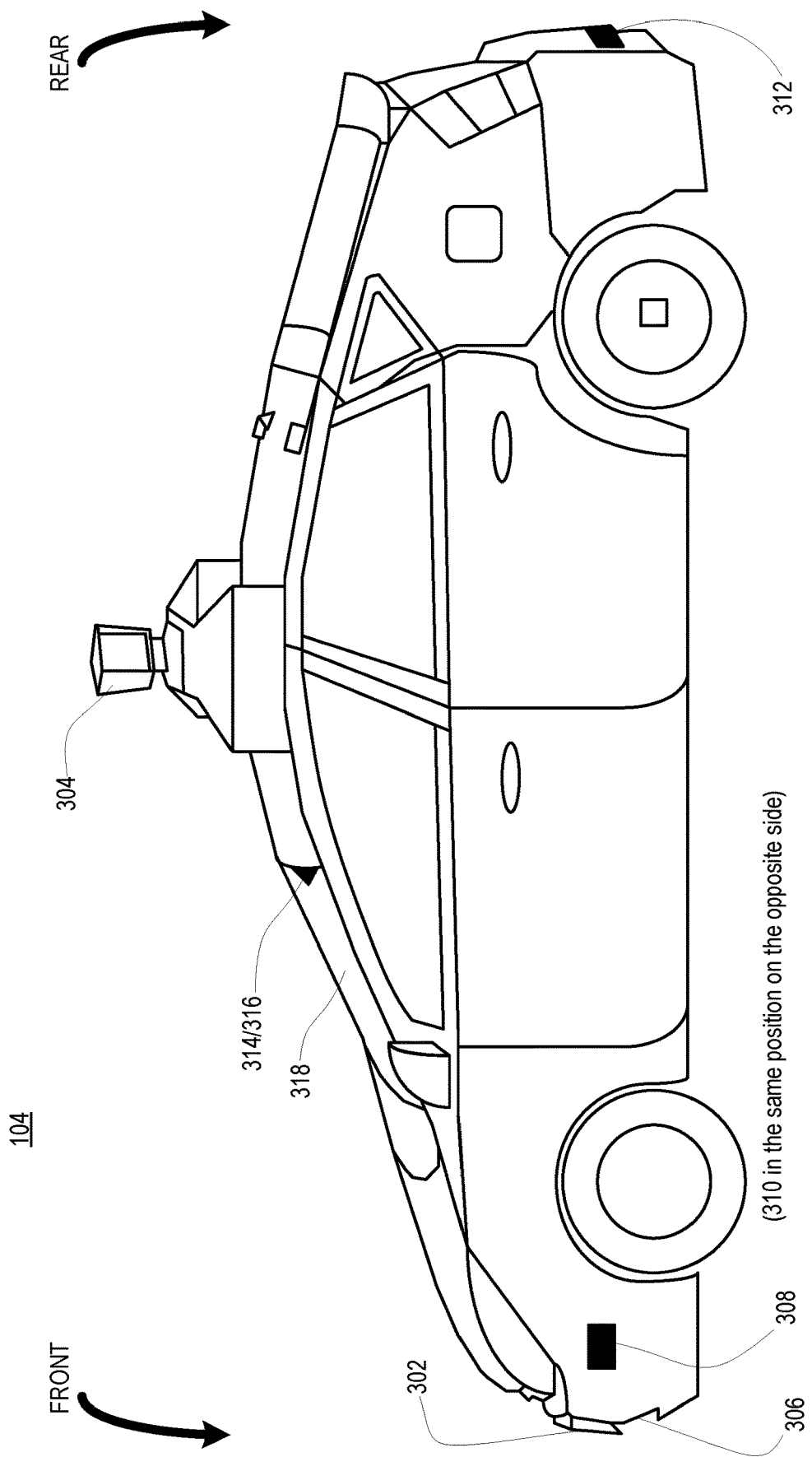
FIG. 3 illustrates an example of the placement of one or more sensors on the autonomous vehicle according to aspects of the disclosure.

FIG. 3 illustrates one example of the autonomous vehicle 104 and the placement of its one or more sensors. The autonomous vehicle 104 may include lasers 302 and 304, for example, mounted on the front and top of the autonomous vehicle 104, respectively. The laser 302 may have a range of approximately 150 meters, a thirty-degree vertical field of view, and approximately a thirty-degree horizontal field of view. The laser 304 may have a range of approximately 50-80 meters, a thirty-degree vertical field of view, and a 360-degree horizontal field of view. The lasers 302-304 may provide the autonomous vehicle 104 with range and intensity information that the processor 106 may use to identify the location and distance of various objects. In one aspect, the lasers 302-304 may measure the distance between the vehicle and object surfaces facing the vehicle by spinning on its axes and changing their pitch.

The autonomous vehicle 104 may also include various radar detection units, such as those used for adaptive cruise control systems. The radar detection units may be located on the front and back of the car as well as on either side of the front bumper. As shown in the example of FIG. 3, the autonomous vehicle 104 includes radar detection units 306-312 located on the side (only one side being shown), front and rear of the vehicle. Each of these radar detection units 306-312 may have a range of approximately 200 meters for an approximately 18 degree field of view as well as a range of approximately 60 meters for an approximately 56 degree field of view.

In another example, a variety of cameras may be mounted on the autonomous vehicle 104. The cameras may be mounted at predetermined distances so that the parallax from the images of two or more cameras may be used to compute the distance to various objects. As shown in FIG. 3, the autonomous vehicle 104 may include two cameras 314-316 mounted under a windshield 318 near the rear view mirror (not shown).

The camera 314 may include a range of approximately 200 meters and an approximately 30 degree horizontal field of view, while the camera 316 may include a range of approximately 100 meters and an approximately 60 degree horizontal field of view.

Figure 4A:
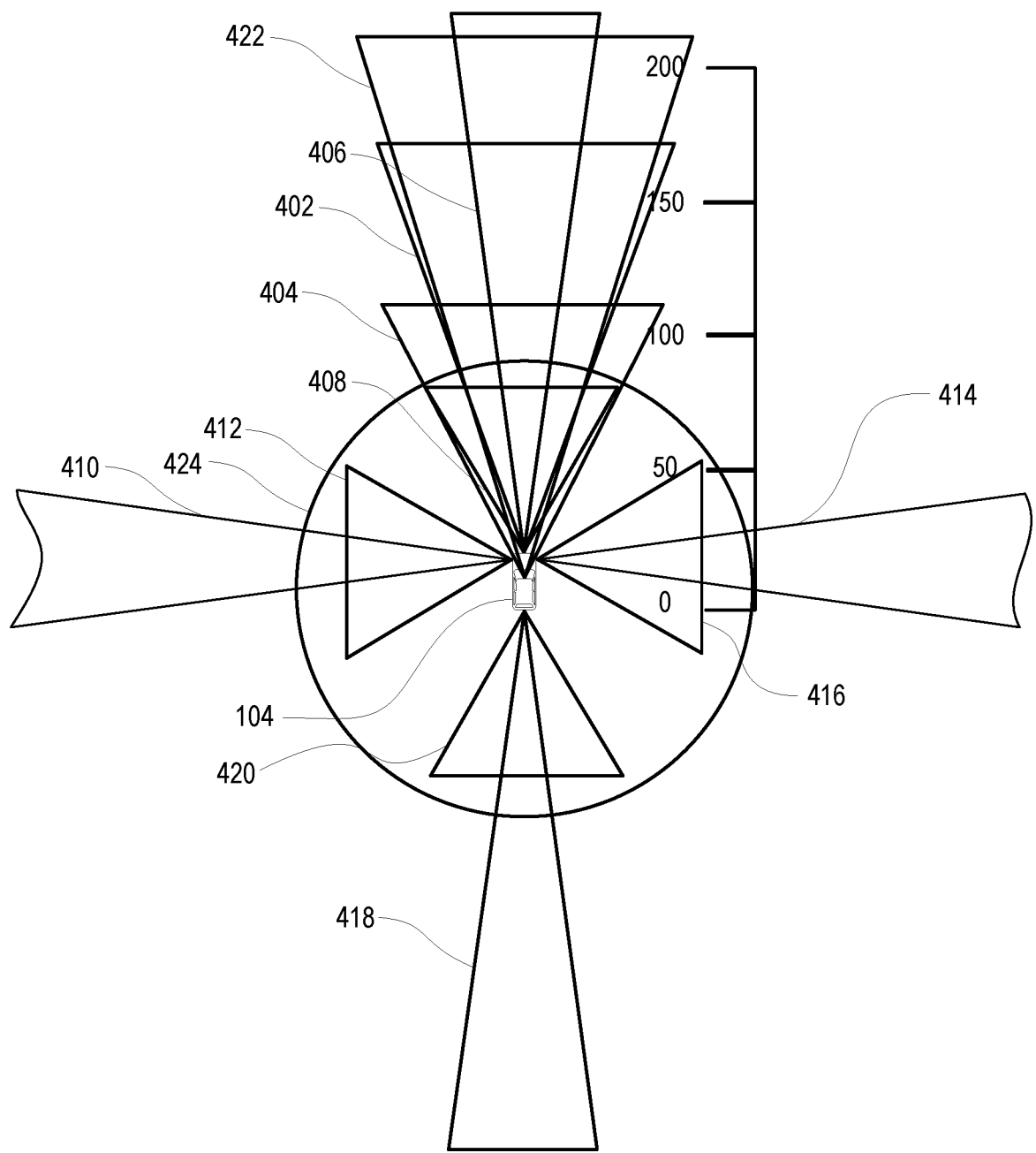
FIGS. 4A-4D illustrate various views of the approximate sensor fields of the various sensors on the autonomous vehicle according to aspects of the disclosure.

Each sensor may be associated with a particular sensor field in which the sensor may be used to detect objects. FIG. 4A is a top-down view of the approximate sensor fields of the various sensors. FIG. 4B depicts the approximate sensor fields 402 and 404 for the lasers 302 and 304, respectively based on the fields of view for these sensors. For example, the sensor field 402 includes an approximately 30 degree horizontal field of view for approximately 150 meters, and the sensor field 404 includes a 360-degree horizontal field of view for approximately 80 meters.

Figure 4D:
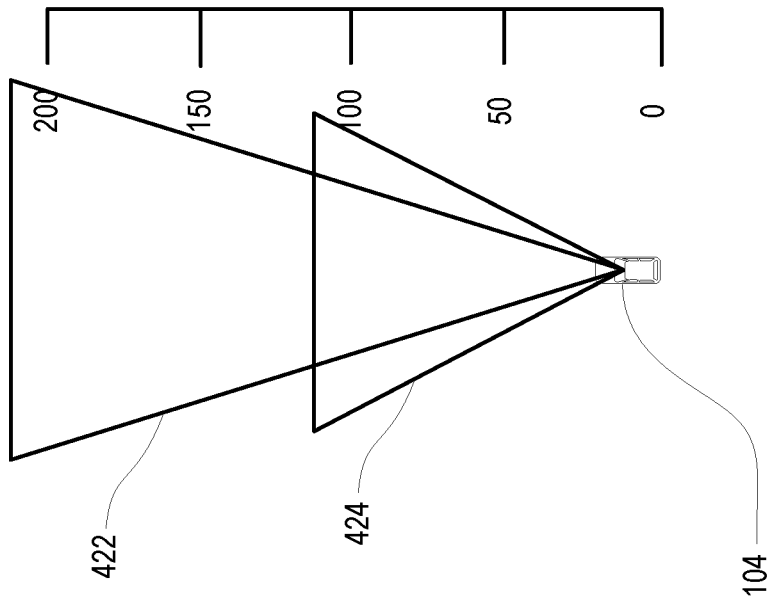
Figure 4B:
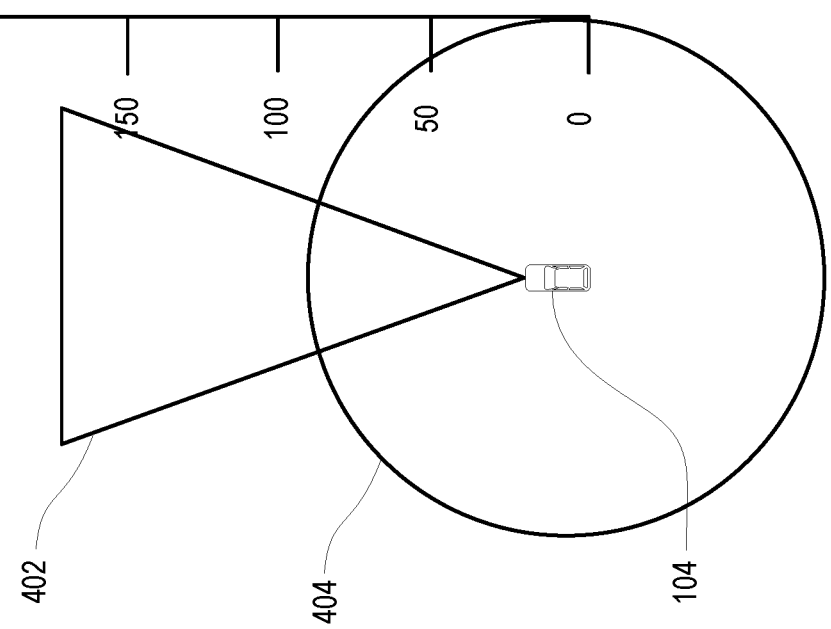
Figure 4C:
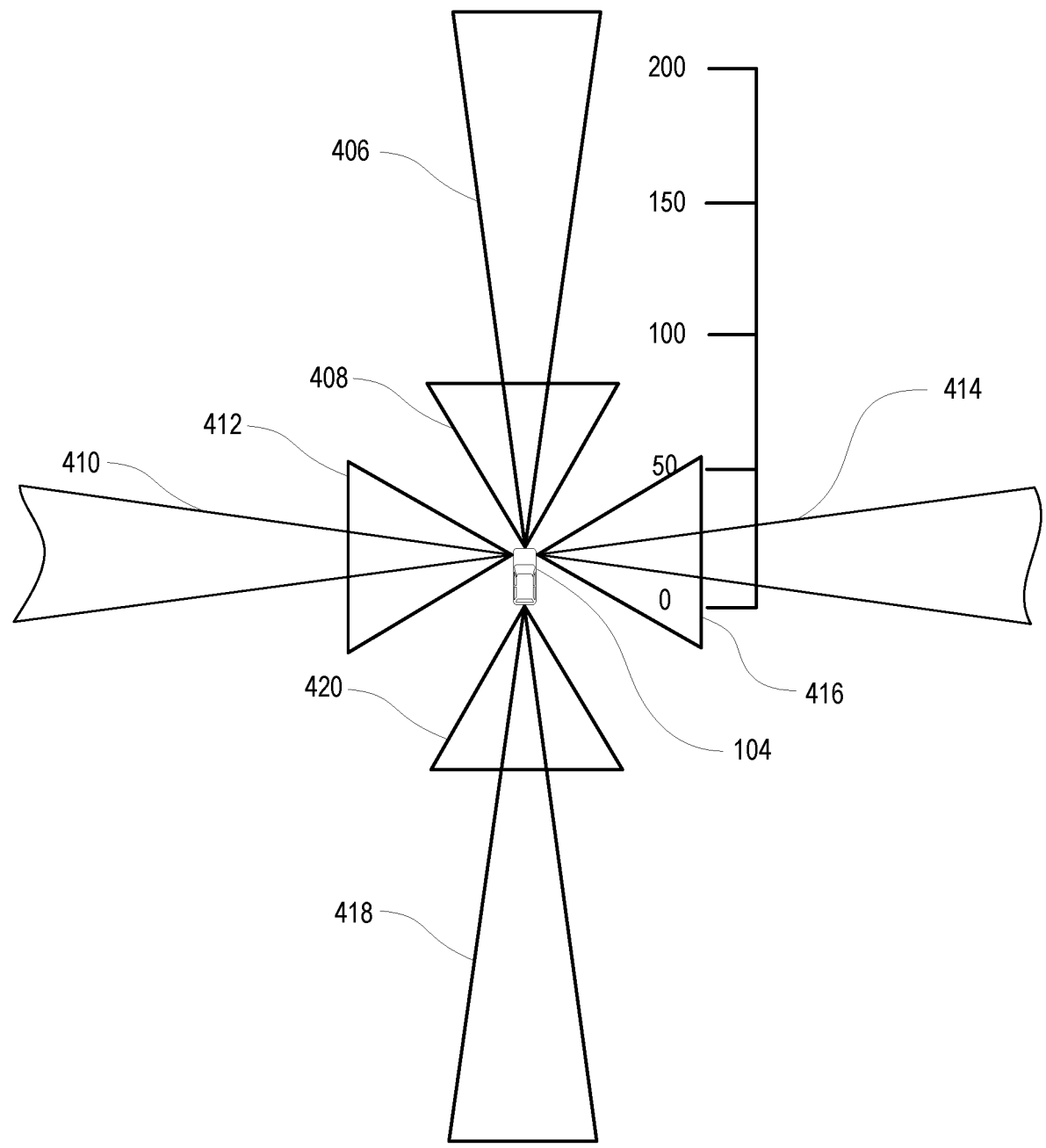

FIG. 4C depicts the approximate sensor fields 406-420 and for radar detection units 306-312, respectively, based on the fields of view for these sensors. For example, the radar detection unit 306 includes sensor fields 406 and 408. The sensor field 406 includes an approximately 18 degree horizontal field of view for approximately 200 meters, and the sensor field 408 includes an approximately 56 degree horizontal field of view for approximately 80 meters.

Similarly, the radar detection units 308-312 include the sensor fields 410/414/418 and sensor fields 412/416/420. The sensor fields 410/414/418 include an approximately 18 degree horizontal field of view for approximately 200 meters, and the sensor fields 412/416/420 include an approximately 56 degree horizontal field of view for approximately 80 meters. The sensor fields 410 and 414 extend passed the edge of FIGS. 4A and 4C.

FIG. 4D depicts the approximate sensor fields 422-424 of cameras 314-316, respectively, based on the fields of view for these sensors. For example, the sensor field 422 of the camera 314 includes a field of view of approximately 30 degrees for approximately 200 meters, and sensor field 424 of the camera 316 includes a field of view of approximately 60 degrees for approximately 100 meters.

In general, an autonomous vehicle 104 may include sonar devices, stereo cameras, a localization camera, a laser, and a radar detection unit each with different fields of view. The sonar may have a horizontal field of view of approximately 60 degrees for a maximum distance of approximately 6 meters. The stereo cameras may have an overlapping region with a horizontal field of view of approximately 50 degrees, a vertical field of view of approximately 10 degrees, and a maximum distance of approximately 30 meters. The localization camera may have a horizontal field of view of approximately 75 degrees, a vertical field of view of approximately 90 degrees and a maximum distance of approximately 10 meters. The laser may have a horizontal field of view of approximately 360 degrees, a vertical field of view of approximately 30 degrees, and a maximum distance of 100 meters. The radar may have a horizontal field of view of 60 degrees for the near beam, 30 degrees for the far beam, and a maximum distance of 200 meters. Hence, the autonomous vehicle 104 may be configured with any arrangement of sensors, and each of these sensors may capture one or more raw images for use by the object detector 130 to detect the various objects near and around the autonomous vehicle 104.

Figure 5:
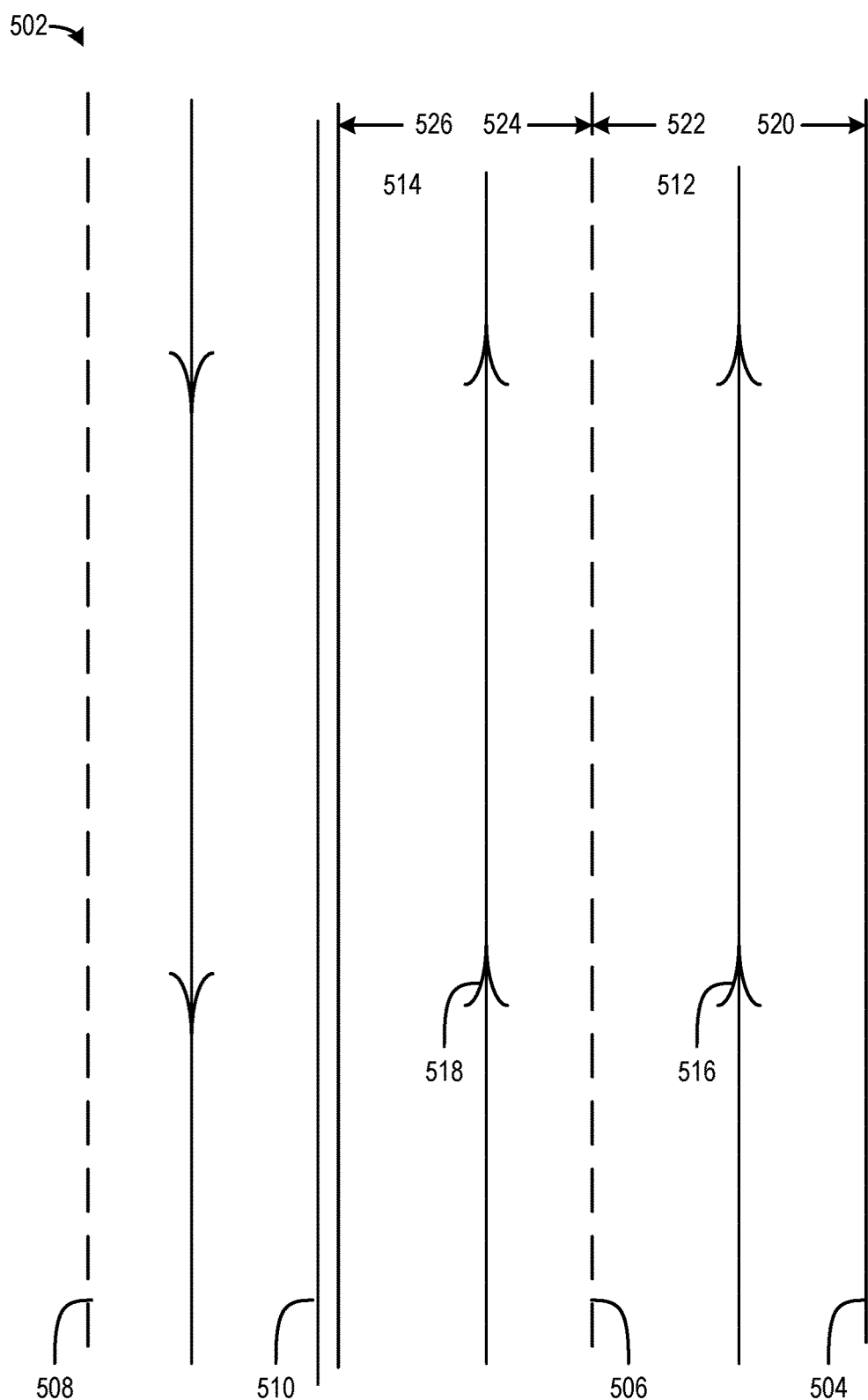
FIG. 5 illustrates an example of detailed map information that may be stored by the autonomous vehicle in accordance with aspects of the disclosure.

FIG. 5 illustrates an example of a portion of a detailed map 502 that may represent the driving environment of the autonomous vehicle 104. The detailed map 502 may be retrieved or referenced by the autonomous vehicle 104 based on a detected position of the autonomous vehicle 104. The detailed map 502 may be stored as part of the detailed map information 114.

The detailed map 502 may further represent a section of a road, such as highway, parkway, etc., and may include lane information such as information about a solid lane line 504, broken lane lines 506, 508, and double solid lane lines 510. These lane lines may define lanes 512 and 514. Each lane may be associated with a centerline rail 516, 518 which may indicate the direction in which a vehicle should generally travel in the respective lane. For example, a vehicle may follow centerline rail 518 when driving along lane 514. In this example, the lane 512 may be bounded by a right lane line 504 and a left lane line 506, and the lane 514 is bounded by a right lane line 506 and a left lane line 510. The edges for lane 512 are edges 520, 522 while the edges for lane 514 are edges 524, 526.

In the example shown in FIG. 5, the detailed map information 114 may be depicted as an image-based map. However, the detailed map information 114 need not be entirely or completely image-based (e.g., raster-based). For example, the detailed map information 114 may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

The detailed map information 114 may be loaded into the memory 108 of the autonomous vehicle 104 at a predetermined time. In one embodiment, the detailed map information 114 may be loaded into the memory 108 of the autonomous vehicle 104 on a daily basis. Alternatively, or in addition, the detailed map information 114 may be loaded into the memory 108 at other predetermined times, such as on a monthly or weekly basis.

In addition, and as discussed previously, the detailed map information 114 may be transferred, or received from, the map provider server 142. Receiving detailed map information 114 from the map provider sever 142 may also include receiving updated detailed map information, including any changes to the driving environment that have occurred since the detailed map information 114 was last transferred to the autonomous driving computer system 144. In one embodiment, the detailed map information 114 may be transferred, or received from, the map provider server 142 when the autonomous driving computer system 144 detects a change in the driving environment corresponding to the detailed map information 114.

Referring back to FIG. 1, the instructions 110 may include various algorithms for determining whether the driving environment has changed relative to its corresponding representation in the detailed map information 114. As discussed previously, the autonomous driving computer system 144 may leverage the vehicle detection algorithm 124 and the map discrepancy algorithm 146 for determining whether such changes have occurred.

Figure 6:
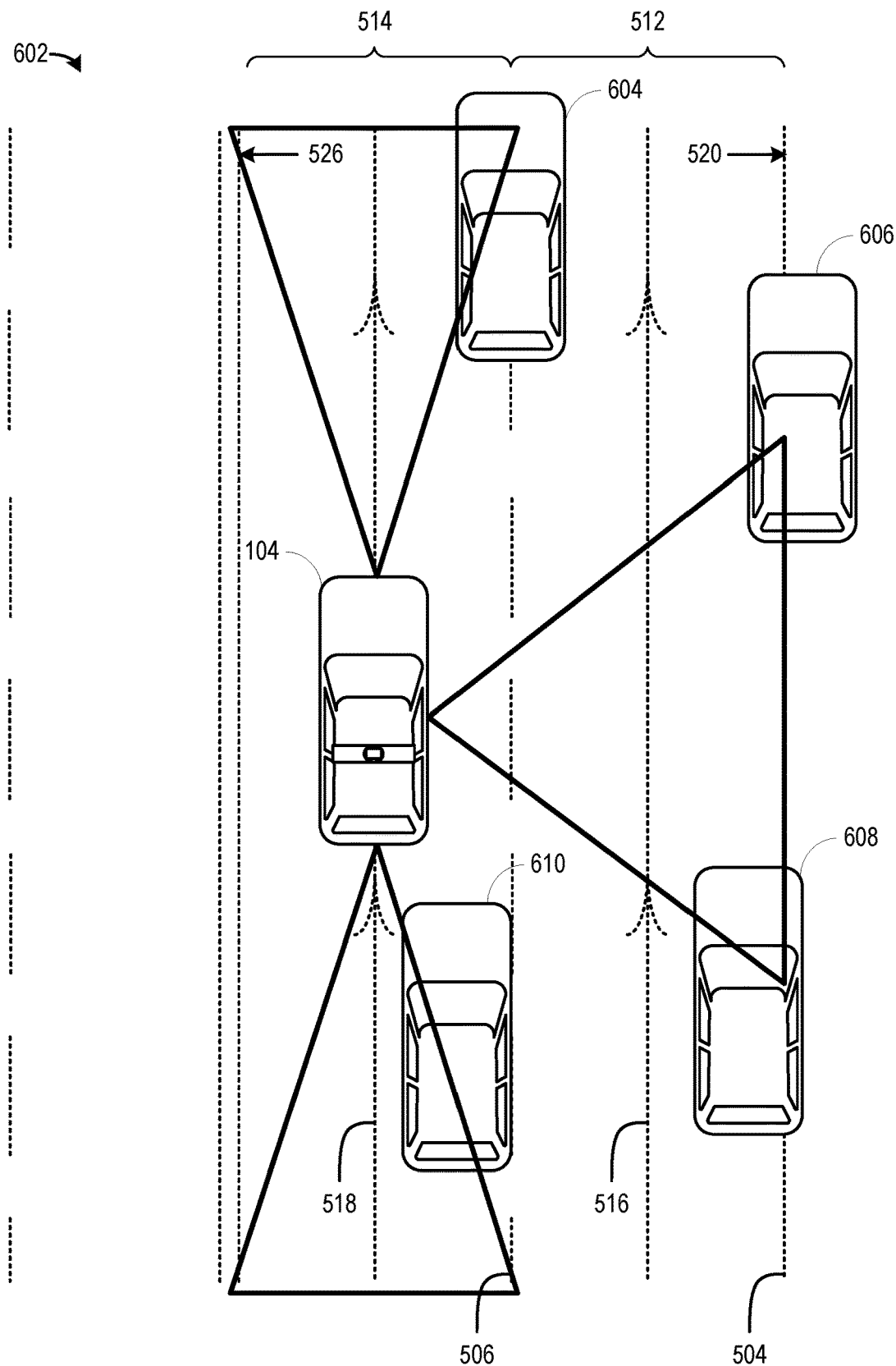
FIG. 6 illustrates an example of the autonomous vehicle detecting one or more vehicles in the driving environment according to aspects of the disclosure.

The vehicle detection algorithm 124 may facilitate the detection of vehicles by the autonomous driving computer system 144. FIG. 6 illustrates an example 602 of the autonomous vehicle 104 in a driving environment. In the example 602, the detected vehicles 604-610 and the autonomous vehicle 104 are driving in a driving environment corresponding to the detailed map 502 of FIG. 5. For contrast, the detailed map 502 is shown in dotted lines while the autonomous vehicle 104 and the detected vehicles 604-610 are shown with solid lines. Moreover, the example 602 illustrates that a change in the driving environment has occurred (i.e., the lanes having been shifted to the right) since the detailed map 502 was provided to the autonomous vehicle 104. The shift in the lanes is evidenced by the fact that the vehicles 604-610 in proximity to the autonomous vehicle 104 are travelling off-center relative to the lanes of the detailed map 502.

The autonomous driving computer system 144 may detect and track the several vehicles 604-610 in the driving environment based on the vehicle detection algorithm 124 and the various sensors 302-316 mounted to the autonomous vehicle 104. In the example 602, each of the vehicles 604-610 are traveling in the same direction as the autonomous vehicle 104, but their distances to the autonomous vehicle 104 may vary.

As examples, the autonomous driving computer system 144 may detect a first vehicle 604 using one or more of the cameras 314-316, a second vehicle 606 using the radar detection unit 310 and/or the laser sensor 304, a third vehicle 608 using the radar detection unit 310 and/or the laser sensor 304, and a fourth vehicle 610 using the radar detection unit 312 and/or the laser sensor 304. Other sensors may also be used to detect the vehicles 604-610, such as the laser sensor 302 being used to detect the first vehicle 604. As discussed previously, the autonomous driving computer system 144 may track the vehicles 604-610 by storing vehicle type and state information, such as position, direction, speed, and other such state information, about the detected vehicles 604-610 in the memory 108 as part of the vehicle data 116.

Moreover, while not shown in FIG. 6, the autonomous driving computer system 144 may also detect and track vehicles traveling in an opposite direction. For example, the autonomous driving computer system 144 may detect and track vehicles traveling in an oncoming direction to the autonomous vehicle 104, such as by using one or more of the laser sensor 304, the laser sensor 302, the radar detection unit 308, the camera sensors 314-316, or any other combination of sensors mounted to the autonomous vehicle 104.

In tracking the vehicles 604-610, the autonomous driving computer system 144 may track one or more of the vehicles 604-610 for a predetermined period of time, until the occurrence of a predetermined condition, or a combination of the two. In tracking the vehicles 604-610 for a predetermined period of time, the autonomous driving computer system 144 may track the vehicles for any period of time including, but not limited to, seconds, minutes, hours, or any other period of time. Examples of predetermined conditions include loss of sight of a tracked vehicle, the tracked vehicle moving a predetermined distance away from the autonomous vehicle 104 (e.g., moving out of range of one or more of the sensors), the autonomous driving computer system 144 determining that it has collected sufficient state information about the tracked vehicle, or other such predetermined conditions. In determining whether sufficient state information has been collected for a tracked vehicle, the autonomous driving computer system 144 may determine whether it has collected enough state information to determine a trajectory for the tracked vehicle.

Figure 7:
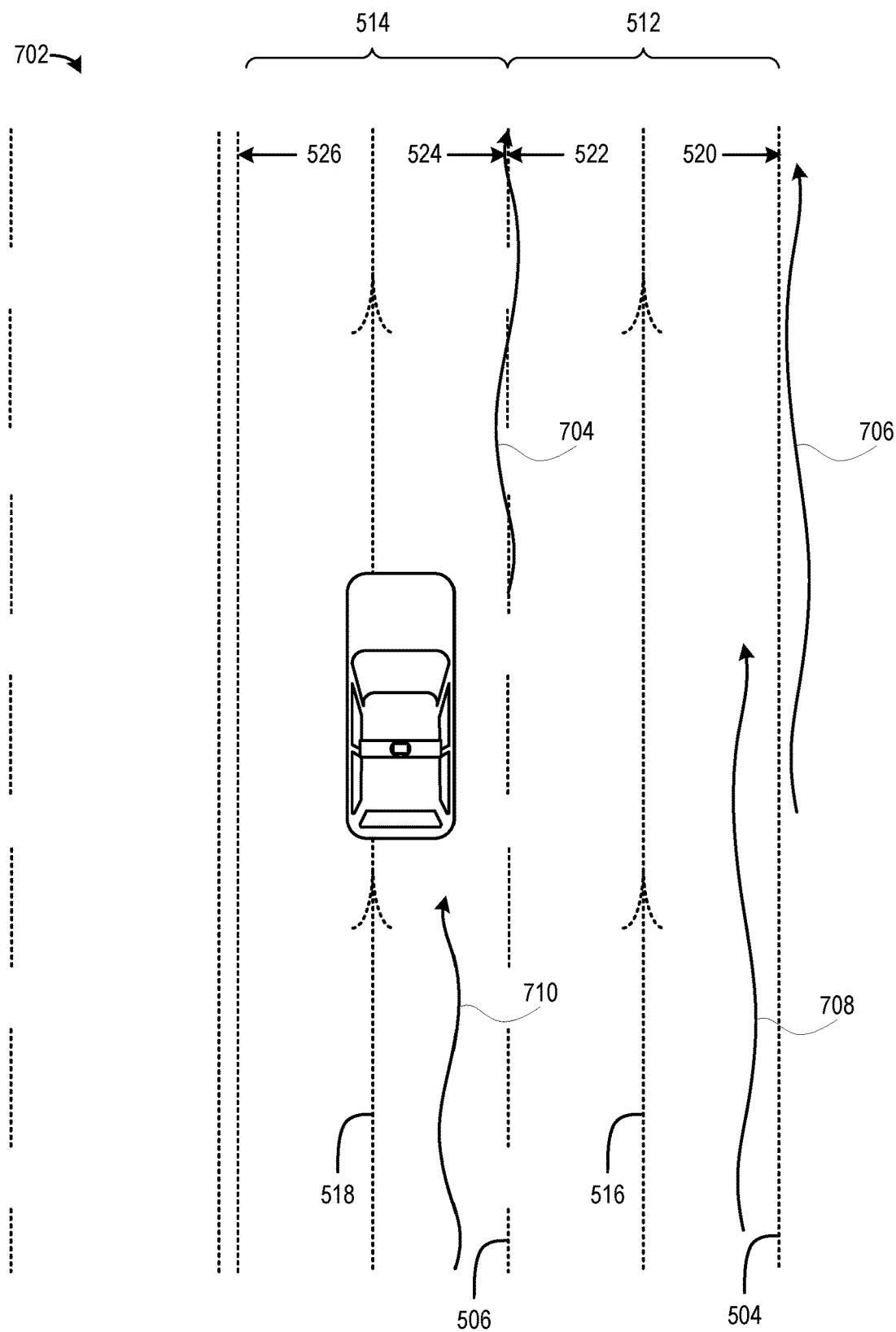
FIG. 7 illustrates an example of the autonomous vehicle determining trajectories for detected vehicles in the driving environment according to aspects of the disclosure.

After tracking one or more of the vehicles 604-610, the autonomous driving computer system 144 may determine corresponding trajectories for the tracked vehicles 604-610. FIG. 7 illustrates an example 702 of the autonomous driving computer system 144 having determined trajectories 704-710 for the tracked vehicles 604-610. As shown in FIG. 7, the autonomous driving computer system 144 may have determined a first trajectory 704 corresponding to the first vehicle 604, a second trajectory 706 corresponding to the second vehicle 606, a third trajectory 708 corresponding to the third vehicle 608, and a fourth trajectory 710 corresponding to the fourth vehicle 610. In general, the trajectories 704-710 may represent the paths the corresponding vehicles 604-610 travelled in the driving environment and their location relative to the detailed map information 114.

The trajectories 704-710 may include slight lateral shifts as it is generally understood that vehicles do not typically travel in absolutely straight lines. These slight lateral shifts are generally due to corrections by a human driver (e.g., a driver turning a steering wheel slightly to the right or left to keep a vehicle driving in a relatively straight path). Each of the trajectories 704-710 may be determined based on the collected state information for the corresponding vehicles 604-610. In one embodiment, a trajectory may include positional information for a corresponding vehicle (e.g., a series of latitudinal and longitudinal points), where the positional information is associated with one or more timestamps (e.g., relative timestamps or absolute timestamps). Further still, a trajectory may be derived as an interpolated series of positions based on the detected positions of the corresponding vehicle.

In addition, the trajectories 704-710 may be determined based on one or more conditions, such as distance, time, or other such factors. For example, the autonomous driving computer system 144 may determine the trajectories 704-710 based on having sufficient distance information for a corresponding vehicle (e.g., 100 feet, 300 meters, two miles, or other distance information). As another example, the autonomous driving computer system 144 may determine the trajectories 704-710 after monitoring the corresponding vehicles for a sufficient amount of time (e.g., two minutes, ten minutes, an hour, etc.). The autonomous driving computer system 144 may also determine the trajectories 704-710 based on combinations and/or variations of these conditions.

Returning to the example of FIG. 7, the autonomous driving computer system 144 may then use the trajectories 704-710 to determine whether changes in the driving environment have occurred. For example, the autonomous driving computer system 144 may determine individually or consolidated average trajectories from the trajectories 704-710, compare the averaged trajectories with the detailed map information 144, and then determine whether there is a consistent bias in the averaged trajectories. The consistent bias may indicate that a change (e.g., a shift in one or more lanes) in the detailed map information 144 has occurred.

Figure 8A:
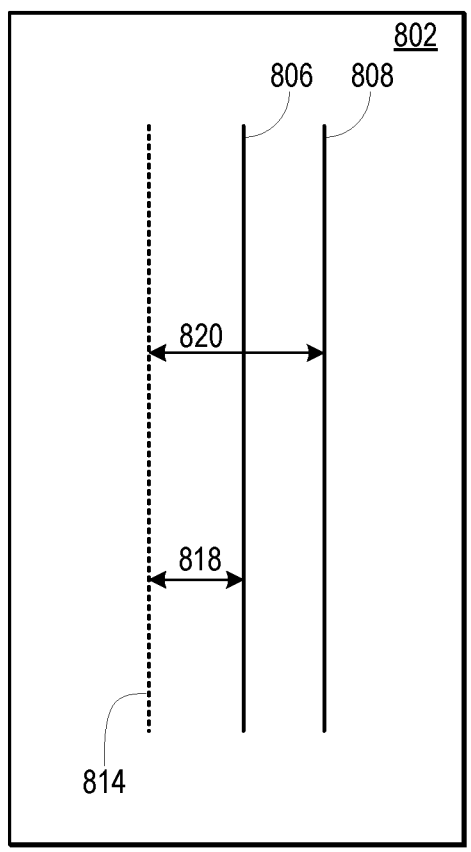
FIGS. 8A-8B illustrate examples of using trajectories to determine whether the driving environment has changed according to aspects of the disclosure.
Figure 8B:
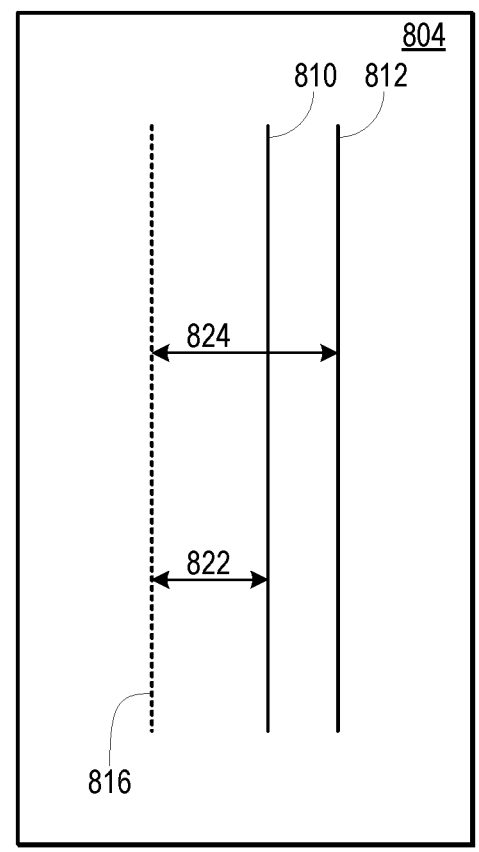

In one embodiment, the autonomous driving computer system 144 may use the individual trajectories 704-710 to determine whether any changes have occurred. FIGS. 8A and 8B illustrate examples 802-804 of the autonomous driving computer system 144 using the individual trajectories 704-710 to determine whether the driving environment has changed. In the examples of 802-804, the autonomous vehicle computer system 144 has individually averaged the determined trajectories 704-710 to produce corresponding smoothed trajectories 806-812. The smoothed trajectories may lack some of the lateral shifts (e.g., oscillations) that are present in the determined trajectories 704-710. The smoothed trajectories 806-812 may be used to determine whether there is a consistent bias in the trajectories of the corresponding vehicles 604-610 relative to the detailed map information 114. While the autonomous driving computer system 144 may use the smoothed trajectories 806-812 to determine whether the detailed map information 114 is inaccurate, it is also possible that the autonomous driving computer system 114 may use the unsmoothed (i.e., raw) trajectories 704-710 to make this determination.

To determine whether the detailed map information 114 is inaccurate, the autonomous driving computer system 144 may identify one or more expected trajectories for a hypothetical vehicle. In one embodiment, an expected trajectory may be based on the centerline for a road lane selected from the detailed map information 114. For example, and with reference to FIG. 5, an expected trajectory, such as the trajectory 814 of FIG. 8A, for lane 514 may be based on the centerline rail 518, and an expected trajectory, such as the trajectory 816 of FIG. 8B, for lane 512 may be based on the centerline rail 516. In another embodiment, the expected trajectory may be based on empirical data from prior observations and tracking of one or more vehicles in the driving environment.

The smoothed trajectories 806-808 may then be compared with the one or more expected trajectories 814-816. The autonomous driving computer system 144 may determine which expected trajectory to compare with the smoothed trajectories 806-808 by comparing the positional information of the corresponding vehicles 604,610 with the positional information of the autonomous vehicle 104. As the autonomous driving computer system 144 may have a presumption about which lane the autonomous vehicle 104 is traveling (even if that presumption is inaccurate), the result of comparing the positional information of the vehicles 604,610 with the positional information of the autonomous vehicle 104 may indicate whether the vehicles are traveling within the same lane of the autonomous vehicle 104 or a different lane.

In comparing the smoothed trajectories with the one or more expected trajectories, the autonomous driving computer system 144 may determine one or more sets of deviation values. These deviation values may be determined by comparing one or more of the expected trajectories with one or more of the determined trajectories (i.e., the smoothed and/or unsmoothed trajectories).

For example, as shown in FIG. 8A, a first set of deviation values 818 may correspond to the difference in distance between one or more positions along the smoothed trajectory 806 (or unsmoothed/raw trajectory 706) and corresponding one or more positions along the expected trajectory 814. A second set of deviation values 820 may correspond to the difference in distance between one or more positions along the smoothed trajectory 808 and corresponding one or more positions along the expected trajectory 814. The first set of deviation values 818 and/or the second set of deviation values 820 may be measured by any distance type, such as millimeters, centimeters, feet, yards, inches, and so forth.

In the second example 804, the autonomous driving computer system 144 may obtain deviation values 822-824 by comparing smoothed trajectories 810,812 with a second expected trajectory 816. A third set of deviation values 822 may correspond to the difference in distance between one or more positions along the smoothed trajectory 810 and corresponding one or more positions along the expected trajectory 816, and a fourth set of deviation values 824 may correspond to the difference in distance between one or more positions along the smoothed trajectory 812 and corresponding one or more positions along the expected trajectory 816.

Although FIGS. 8A-8B illustrate examples involving two trajectories each (here, trajectories 806-808 and trajectories 810-812), the autonomous driving computer system 144 may determine more or fewer trajectories for comparing with an expected trajectory. For example, the autonomous driving computer system 144 may be configured to determine a threshold number of trajectories for comparing with an expected trajectory. The threshold number of trajectories may be any number of trajectories, e.g., one, two, ten, or any other number. In addition, the number of trajectories may include any combination of unique trajectories, where each trajectory corresponds to a unique vehicle, or non-unique trajectories, where different trajectories may correspond to the same vehicle.

In comparing the determined trajectories with the expected trajectories, the autonomous driving computer system 144 may obtain a variety of metrics for determining whether the driving environment has changed, and thus, whether the detailed map information 114 is inaccurate. These metrics may include, for example, a maximum deviation metric, an average deviation metric, and an average signed deviation metric.

The maximum deviation metric may indicate the maximum difference between a determined trajectory and an expected trajectory. With reference to the examples 802-804, the second set of deviation values 820 and the fourth set of deviation values 824 may each include a maximum deviation value for each set of compared trajectories (i.e., trajectories 806-808 and trajectories 810-812).

The average deviation metric may indicate the average difference between the determined trajectory and the expected trajectory. The average deviation for example 802 may be determined by averaging, individually or combined, the first set of deviation values 818 and the second set of deviation values 820. Similarly, the average deviation for the example 804 may be determined by averaging, individually or combined, the third set of deviation values 822 and the fourth set of deviation values 824.

The average signed deviation metric may indicate whether the difference between the determined trajectory and the expected trajectory is negative (i.e., the trajectories have been laterally shifted to the left), positive (i.e., the trajectories have been laterally shifted to the right), or neutral (i.e., the trajectories have not been shifted). As with the average deviation, the average signed deviation for the example 802 may be determined based on determining a signed average, individually or combined, of the first set of deviation values 818 and the second set of deviation values 820. A similar determination may also be made for the example 804.

One or more of the foregoing metrics may be used to determine whether, and to what extent, a change has occurred in the driving environment. For example, the maximum deviation metric and/or the average deviation metric(s) may be compared with a threshold deviation metric to indicate whether a changed has, in fact, occurred. Where the maximum deviation metric and/or the average deviation metric exceeds the threshold deviation metric, the autonomous vehicle computer system 144 may determine that there has been a change in the driving environment. Moreover, the average signed deviation metric(s) may indicate the degree and direction of the change in the driving environment.

For example, with reference to FIG. 8A, the average signed deviation metric(s) may be positive, since the smoothed trajectories 806-808 are illustrated to the right of the expected trajectory 814. Similarly, the average signed deviation metric(s) for FIG. 8B may be positive since the smoothed trajectories 810-812 are also to the right of the expected trajectory 816. Further still, the magnitude of the average signed deviation metric(s) may indicate to the autonomous driving computer system 144 the amount of change in the driving environment. Accordingly, based on one or more of these metrics, the autonomous driving computer system 144 may determine whether a driving environment has changed.

Furthermore, the autonomous driving computer system 144 may leverage a probability function that provides a probability value (or confidence value) that the driving environment has changed. The probability function may refer to one or more probability models to determine whether a driving environment has changed. As input, the probability function may accept one, or a combination of, the foregoing deviation metrics, such as the maximum deviation metric, the average deviation metric, the average signed deviation metric, and so forth.

The autonomous driving computer system 144 may also store one or more probability models, such as a probability model for a highway, a probability model for a parkway, and so forth, and the autonomous driving computer system 144 may select which of the probability models to use in the probability function based on the location, or driving environment, of the autonomous vehicle 104. In this manner, the probability function may provide a more granular determination of whether the driving environment has changed (e.g., 83%) in contrast to the determination of whether the driving environment has changed based on comparing the deviation metric values with corresponding thresholds (e.g., yes, where the deviation metric is greater than the threshold; no, where the deviation metric is not greater than the threshold).

In addition to relying on metrics determined for individual trajectories, the autonomous vehicle computer system 144 may determine metrics for trajectories where the corresponding vehicles are within a predetermined distance, or distance threshold, to the autonomous vehicle 104. The autonomous vehicle computer system 144 may also determine metrics for consolidated trajectories. These approaches are described with reference to FIGS. 9-11.

Figure 9:
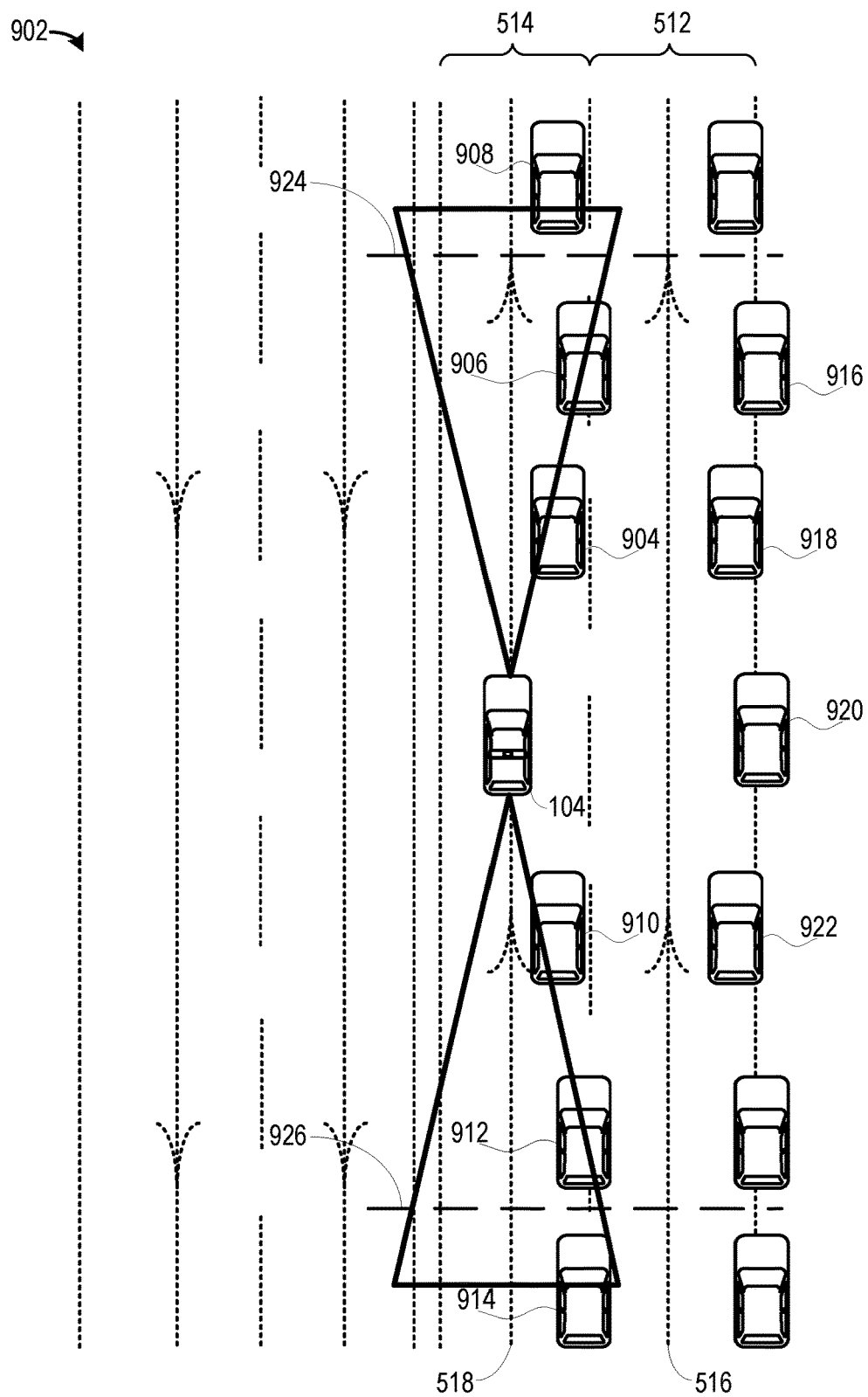
FIG. 9 illustrates another example of the autonomous vehicle detecting one or more vehicles in the driving environment according to aspects of the disclosure.

In one embodiment, the autonomous vehicle 104 may detect one or more vehicles travelling in front of the autonomous vehicle 104 and one or more vehicles travelling behind the autonomous vehicle 104. FIG. 9 illustrates an example where the autonomous vehicle 104 is in a driving environment that has denser traffic than the driving environment shown in FIG. 6. For simplicity, the detailed map 502 of FIG. 5 is used in FIG. 9.

Although FIG. 9 illustrates that the autonomous vehicle 104 may detect vehicles 904-908 and vehicles 910-914 travelling in front and behind, respectively, the autonomous vehicle 104 may also detect vehicles travelling in a different lane (e.g., any of vehicles 916-922) or vehicles travelling in a different direction, such as vehicles travelling in an oncoming direction relative to the autonomous vehicle 104.

Figure 10:
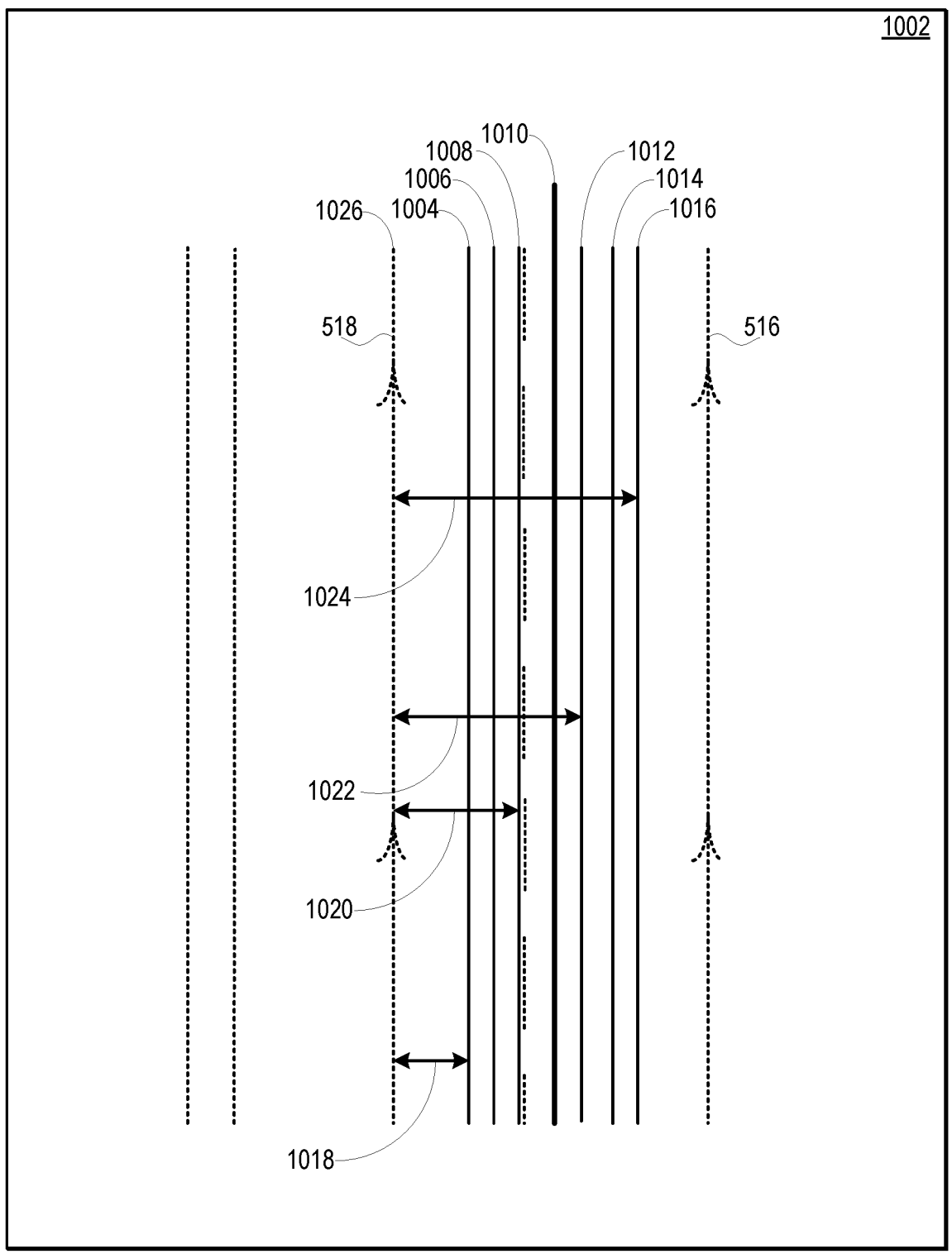
FIG. 10 illustrates an example of the autonomous vehicle comparing determined trajectories for the detected one or more vehicles from FIG. 9 according to aspects of the disclosure.

Based on detecting and monitoring other vehicles, the autonomous driving computer system 144 may determine corresponding raw trajectories (not shown). As discussed previously, the autonomous driving computer system 144 may determine the raw trajectories based on the stored vehicle data 116, such as a vehicle's position, direction, speed, and other such vehicle data 116. These raw trajectories may be individually averaged to produce smoothed trajectories. FIG. 10 illustrates an example 1002 where the raw trajectories for vehicles have been averaged to produce corresponding smoothed trajectories 1004-1016.

The example 1002 illustrates the lateral distances of the smoothed trajectories 1004-1016 from the autonomous vehicle 104. For reference purposes, a first smoothed trajectory 1004 may correspond to vehicle 904, a second smoothed trajectory 1006 may correspond to vehicle 908, a third smoothed trajectory 1008 may correspond to vehicle 910, a fourth smoothed trajectory 1012 may correspond to vehicle 906, a fifth smoothed trajectory 1014 may correspond to vehicle 914, and a sixth smoothed trajectory 1016 may correspond to vehicle 912. The smoothed trajectory 1010 may correspond to the autonomous vehicle 104.

As with the examples of 8A and 8B, in the example of FIG. 10, the autonomous driving computer system 144 may determine deviation metric values based on comparing the smoothed trajectories with the previously stored detailed map information 114 (e.g., the portion of the detailed map 502). In particular, the autonomous driving computer system 144 may determine the deviation metric values 1018-1024 based on comparing the smoothed trajectories 1004-1016 with an expected trajectory 1026. In one embodiment, the expected trajectory 1026 may be the centerline rail 518 of the lane in which the autonomous driving computer system 144 estimates that the autonomous vehicle 104 is traveling. In other embodiments, the autonomous driving computer system 144 may use an expected trajectory derived from empirical data of vehicles traveling in the driving environment.

The autonomous vehicle 104 may determine which of the smoothed trajectories 1004-1016 to use when determining deviation metric values based on the distance between the vehicles corresponding to the smoothed trajectories and the autonomous vehicle 104. With reference to FIG. 9, the autonomous vehicle 104 may be capable of detecting vehicles 904-914. However, as vehicle data (e.g., speed, direction, type, etc.) for a vehicle may become less reliable as the distance between the vehicle and the autonomous vehicle 104 increases, the autonomous driving computer system 144 may employ various distance thresholds, such as distance thresholds 924-926, to determine which vehicle trajectories to use in determining the deviation metric values 1018-1024.

The distance thresholds may be any measure of distance, such as meters, feet, yards, inches, centimeters and so forth. In one embodiment, a front distance threshold 924 and a rear distance threshold 926 may be 150 feet. Although not shown, the autonomous vehicle 104 may also have lateral distance thresholds, such as a left lateral distance threshold and a right lateral distance threshold. The autonomous vehicle 104 may employ any combination of distance thresholds to limit which vehicle trajectories to use in determining the deviation metric values.

As previously discussed, the autonomous vehicle 104 may determine further deviation metric values based on the deviation metric values determined from comparing smoothed trajectories with an expected trajectory. As discussed previously, the further deviation metrics may include one or more maximum deviation metrics (e.g. a maximum deviation metric for each individual trajectory or a maximum deviation metric for the set of trajectories), one or more average deviation metrics, and one or more average signed deviation metrics. These deviation metrics may have corresponding thresholds (i.e., a maximum deviation metric threshold, an average deviation metric threshold, and an average signed deviation metric threshold) that the autonomous driving computer system 144 uses to determine whether the driving environment has changed.

Similarly, as discussed with reference to FIGS. 8A-8B, the autonomous driving computer system 144 may also use a probability function and one or more probability models to determine whether the driving environment has changed. In this regard, the autonomous driving computer system 144 may select a probability model based on the driving environment or location of the autonomous vehicle 104. The autonomous driving computer system 144 may then provide the probability function with the selected probability model, the maximum deviation metric, the average deviation metric, and/or the average signed deviation metric. The result of the probability function may indicate the probability that the driving environment has changed relative to the detailed map information 114.

Figure 11:
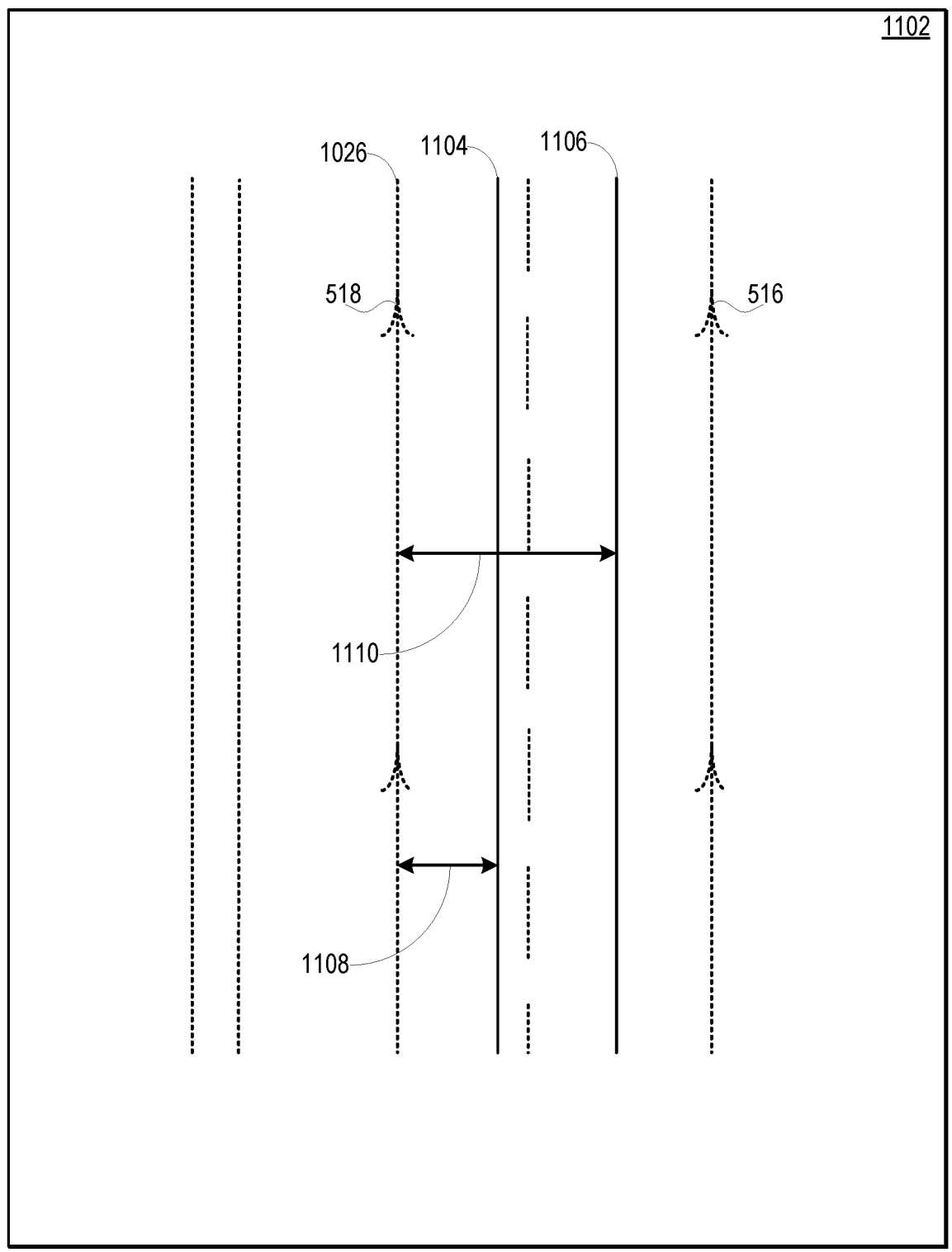
FIG. 11 illustrates an example of the autonomous vehicle comparing consolidated trajectories for the detected one or more vehicles from FIG. 9 according to aspects of the disclosure.

As noted above, in addition to, or as an alternative, the autonomous driving computer system 144 may use consolidated trajectories for determining whether the driving environment has changed relative to the detailed map information 114. In FIG. 11, the autonomous driving computer system 144 has determined a first consolidated trajectory 1104 and a second consolidated trajectory 1106. The consolidated trajectories 1104,1106 may represent an average of two or more of the smoothed trajectories 1004-1016 or an average of two or more of the raw trajectories for the vehicles detected by the autonomous driving computer system 144.

More particularly, which trajectory, or trajectories, to include in a consolidated trajectory may be based on each smoothed (or raw) trajectory's relationship to the trajectory of the autonomous vehicle 104 or the relationship between each trajectory's corresponding vehicle and the autonomous vehicle 104. For example, trajectories that are determined to be to the left of the autonomous vehicle may be consolidated into one consolidated trajectory and trajectories that are determined to be to the right of the autonomous vehicle may be consolidated into another consolidated trajectory. Similar groupings may be performed for trajectories determined to be in other lanes, for trajectories determined to be from oncoming traffic, or other similar groupings.

For example, and with reference to FIG. 10, the autonomous driving computer system 144 has determined that smoothed trajectories 1004-1008 are each to the left of the trajectory 1010 for the autonomous vehicle 104. Similarly, the autonomous driving computer system 144 has determined that smoothed trajectories 1012-1016 are each to the right of the trajectory 1010 for the autonomous vehicle 104. Accordingly, in one embodiment, smoothed trajectories 1004-1008 may be consolidated into a single, consolidated trajectory (i.e., consolidated trajectory 1104), and smoothed trajectories 1012-1016 may be consolidated into another single, consolidated trajectory (i.e., consolidated trajectory 1106).

In another embodiment of consolidating trajectories, the smoothed trajectories may be consolidated based on portions of the trajectories that share overlapping portions. As there are times that vehicles travel in relatively straight lines, such as on a highway or the like, it would not be unexpected for more than one vehicle to have similar, or nearly identical trajectories. For example, with reference to FIG. 9, one might expect that vehicle 904 and vehicle 910 to have similar trajectories. As another example, one might expect that vehicle 906 and vehicle 912 to have similar trajectories. Accordingly, there may be portions of the trajectories for vehicle 904 and vehicle 910 that overlap (or are within a degree of tolerance, e.g., three or four centimeters), and there may be portions of the trajectories for vehicle 906 and vehicle 912 that overlap (or are also within a degree of tolerance, e.g., three or four centimeters). Based on detecting that portions of these trajectories overlap, the autonomous driving computer system 144 may consolidate these trajectories. Consolidating trajectories based on which portions overlap may include consolidating the complete trajectories, only the portions of those trajectories that overlap (e.g., two vehicles may have similar trajectories, but one of those vehicles may change lanes), or a combination of the foregoing.

Referring back to FIG. 11, the autonomous driving computer system 144 may then determine deviation metric values 1108-1110 by comparing the consolidated trajectories with the expected trajectory 1026. As discussed with reference to FIG. 10, the expected trajectory 1026 may be based on the centerline rail 518 of the lane in which the vehicles are traveling, on empirical data from previously monitoring and observing other vehicles, or a combination of the foregoing. Based on the determined deviation metric values 1108-1110, the autonomous driving computer system 144 may also determine one or more maximum deviation metric values (e.g., a maximum deviation metric value for each individual trajectory 1108-1110 or a maximum deviation metric value for the set of trajectories 1108-1110), one or more average deviation metric values, one or more average signed deviation metric values, the probability value that the driving environment has changed, and so forth.

Furthermore, one of the challenges in determining whether the driving environment has changed relative to the detailed map information 114 based on consolidated trajectories (e.g., trajectories 1104-1106), is that there may be extraneous errors introduced into the consolidated trajectories from the underlying smoothed or raw trajectories. Accordingly, the autonomous driving computer system 144 may determine a consolidated trajectory quality value that indicates the quality of the consolidated trajectory. Factors that may change the consolidated trajectory quality value may include the number of trajectories used in the consolidation, the noisiness of the individual trajectories, the accuracy of the individual trajectories, and other such factors. Increasing the number of individual trajectories used, using relatively clean (e.g., less noisy) individual trajectories, and using relatively accurate trajectories may produce a greater consolidated trajectory quality value (e.g., a value of 80 out of 100). In contrast, a fewer number of individual trajectories used, noisiness in the individual trajectories, and using relatively inaccurate trajectories may produce a lower consolidated trajectory quality value (e.g., a value of 20 out of 100). In one embodiment, the consolidated trajectory quality value may be a multiplier that scales one or more of the determined metric values and/or probability value to account for the quality of the consolidated trajectory.

Accordingly, in addition to determining the one or more maximum deviation metric values, the one or more average deviation metric values, the one or more average signed deviation metric values, and/or the probability value based on the consolidated trajectories for determining whether the driving environment has changed relative to the detailed map information 114, the autonomous driving computer system 144 may also determine the consolidated trajectory quality value when one or more trajectories are being consolidated.

Figure 12:
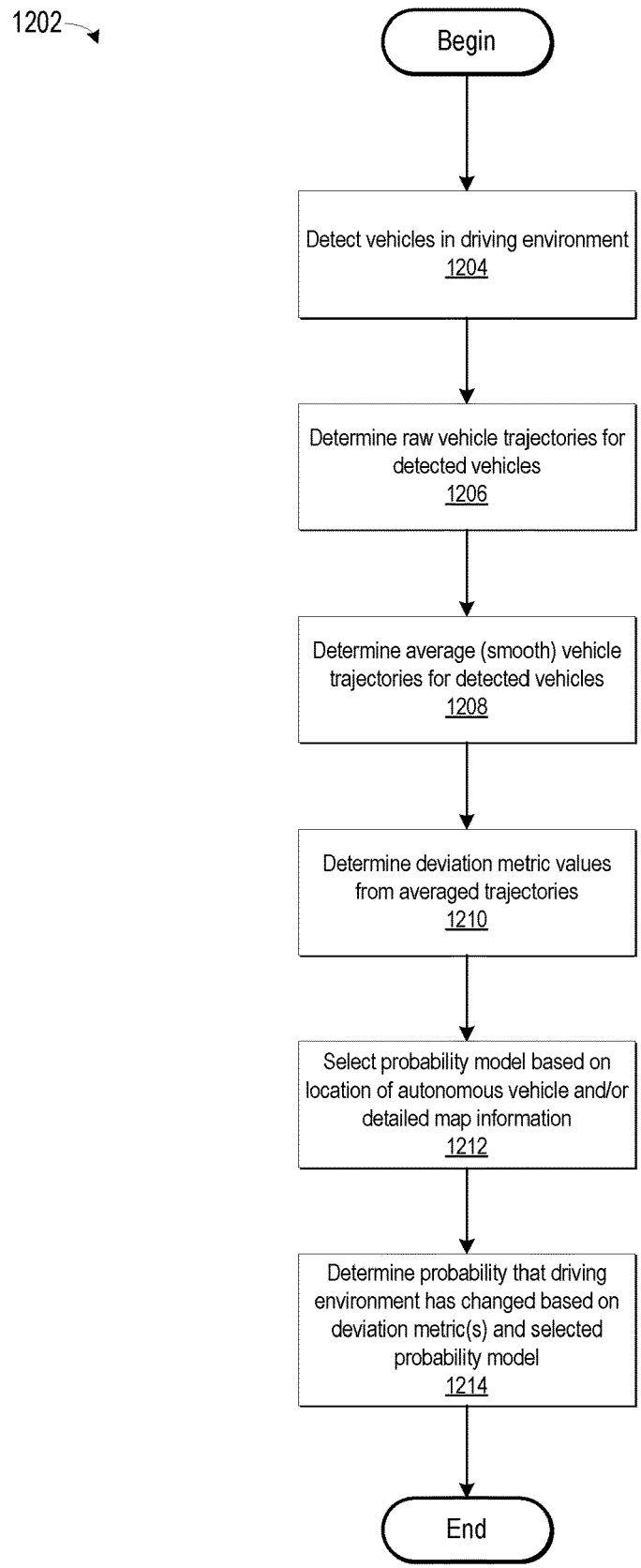
FIG. 12 illustrates a first example of logic flow for determining whether the driving environment has changed based on one or more detected vehicles according to aspects of the disclosure.

FIG. 12 illustrates a first example of logic flow 1202 for determining whether a driving environment has changed based on determined trajectories for one or more detected vehicles according to aspects of this disclosure. Initially, the autonomous driving computer system 144 may detect and track one or more vehicles in a driving environment (Block 1204). The autonomous driving computer system 144 may detect the one or more vehicles by using one or more of the sensors mounted on the autonomous vehicle 104, such as the laser sensors 302-304, radar detection units 306-312, the cameras 314-316, or a combination of these sensors.

The autonomous driving computer system 144 may then store state information about the detected vehicles as vehicle data 116. As previously discussed, the state information about the detected vehicles may include vehicle speed, vehicle direction, the type of vehicle, the distance between the autonomous vehicle 104 and the detected vehicle, and other such state information.

From the state information of the detected vehicles, the autonomous driving computer system 144 may determine one or more raw trajectories for corresponding detected vehicles (Block 1206). A raw trajectory may comprise positional, speed, and direction information for a corresponding vehicle over a given time frame. The autonomous driving computer system 144 may then determine an averaged, or smoothed, trajectory from the raw trajectory (Block 1208). In one embodiment, the autonomous driving computer system 144 may determine the smoothed trajectory by averaging the positional information of the raw trajectory over the time frame, in its entirety or a portion thereof.

The autonomous driving computer system 144 may then determine one or more deviation metric values from the averaged one or more trajectories (Block 1210). As previously discussed, the deviation metric values may be determined by comparing an averaged trajectory with an expected trajectory determined, or obtained from, the detailed map information 114. In one embodiment, the expected trajectory may be a centerline of a lane in which the autonomous driving computer system 144 determines that a detected vehicle is traveling.

The autonomous driving computer system 144 may then determine whether a change in the driving environment has occurred relative to the detailed map information 114. For example, the autonomous driving computer system 144 may compare one or more of the determined metric values to a corresponding metric threshold. Should one or more of the determined metric values exceed their corresponding threshold, the autonomous driving computer system 144 may determine that the driving environment has changed.

Further still, the autonomous driving computer system 144 may leverage the probability function to determine the probability that the driving environment has changed relative to the detailed map information 114. In one embodiment, the autonomous driving computer system 144 may select a probability model corresponding to the driving environment of the autonomous vehicle 104 (Block 1212). The selected probability model may also correspond to the detailed map information 114. The autonomous driving computer system 144 may then use one or more of the determined metrics and the selected probability model as inputs to the probability function. The probability function may then yield the probability that the driving environment has changed (Block 1214).

Although not shown in FIG. 12, the autonomous driving computer system 144 may take one or more actions based on the determined probability that the driving environment has changed. In one embodiment, one or more probability thresholds may be established that correspond to the one or more actions, and the autonomous driving computer system 144 may perform these actions when one or more of these probability thresholds are exceeded.

For example, a first probability threshold, such as 50%, may correspond with an action to display a warning. Thus, when the probability that the driving environment has changed equals or exceeds this first threshold, the autonomous driving computer system 144 may display a warning that the driving environment may have changed. In another example, a second probability threshold, such as 75%, may correspond with an action for the autonomous driving computer system 144 to update the detailed map information, such as by communication with the map provider server 142. Thus, when the probability that the driving environment has changed equals or exceeds this second threshold, the autonomous driving computer system 144 may request updated detailed map information from the map provider server 142. Further still, where this second probability threshold is met or exceeded, the autonomous driving computer system 144 may also display a warning regarding the determined change in the driving environment (e.g., the first probability threshold having been exceeded).

Figure 13:
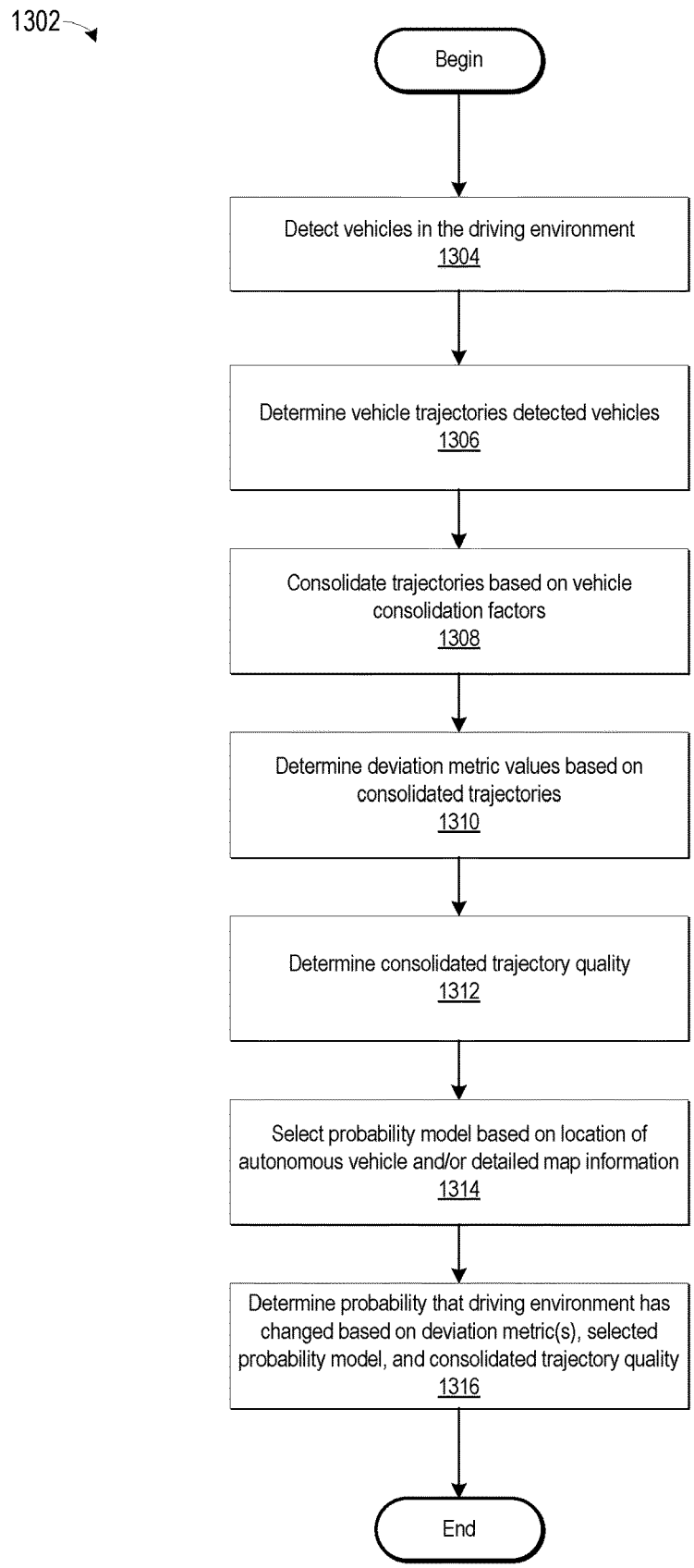
FIG. 13 illustrates a second example of logic flow for determining whether the driving environment has changed based on one or more detected vehicles according to aspects of the disclosure

Referring to FIG. 13 is another example of logic flow 1302 for determining whether a driving environment has changed based on determined trajectories for one or more vehicles. In FIG. 13, the autonomous driving computer system 144 may determine whether the driving environment has changed relative to the detailed map information 114 based on one or more consolidated trajectories.

Similar to the logic flow 1202 of FIG. 12, the logic flow 1302 of FIG. 13 may include detecting one or more vehicles in a driving environment (Block 1304), determining one or more raw trajectories from the detected vehicles (Block 1306), and then determining one or more averaged trajectories from the determined raw trajectories (also Block 1306).

Thereafter, the autonomous driving computer system 144 may consolidate one or more of the trajectories into one or more consolidated trajectories (Block 1308). As discussed previously, a consolidated trajectory may represent an average of one or more of the determined trajectories (including raw trajectories, estimated trajectories, or a combination of the two).

More particularly, the autonomous driving computer system 144 may consolidate the determined trajectories based on one or more consolidation factors. These factors may include a trajectory's relationship to the autonomous vehicle 104 or the trajectory of the autonomous vehicle, the quality of the trajectory (e.g., its accuracy, noisiness, duration, etc.), and other such factors.

After consolidating the one or more determined trajectories into one or more consolidated trajectories, the autonomous driving computer system 144 may then determine one or more deviation metric values (Block 1310). The autonomous driving computer system 144 may also determine one or more consolidated trajectory quality values that indicate the quality of one or more of the consolidated trajectories (Block 1312). As discussed previously, a consolidated trajectory quality value may be a multiplier that scales one or more of the deviation metrics, the probability value that the driving environment has changed, or a combination thereof.

The autonomous driving computer system 144 may then determine whether a change in the driving environment has occurred relative to the detailed map information 114. For example, the autonomous driving computer system 144 may compare one or more of the determined metric values to a corresponding metric threshold. Should one or more of the determined metric values exceed their corresponding threshold, the autonomous driving computer system 144 may determine that the driving environment has changed.

Further still, the autonomous driving computer system 144 may select a probability model for use in determining whether the driving environment has change (Block 1314). The probability model may be associated with the location of the autonomous vehicle 104, the driving environment, the detailed map information 114, or a combination thereof. As discussed previously, the autonomous driving computer system 144 may store varying probability models for different driving environments.

Finally, the autonomous driving computer system 144 may then determine the probability that the driving environment has changed (Block 1316). In one embodiment, the autonomous driving computer system 144 may determine whether the driving environment has changed by passing the determined deviation metric values, the consolidated trajectory quality value, and/or the selected probability model to a probability function. The result of the probability function may indicate a probability that the driving environment has changed. As discussed previously, one or more probability thresholds may be established in the autonomous driving computer system 144 that correspond to actions, such as displaying a warning, requesting updating detailed map information, etc., and the autonomous driving computer system 144 may perform one or more of these actions based on comparing the result of the probability function with one or more of these probability thresholds.

In this manner, the autonomous driving computer system 144 determines whether a driving environment has changed relative to previously stored detailed map information 114. As the driving environment may changed since the detailed map information was last updated in the autonomous driving computer system 144, the autonomous driving computer system 144 may rely monitoring the behavior of surrounding vehicles to determine whether a change has occurred. Further still, the autonomous driving computer system 144 may monitor for consistent behavior changes by the surrounding vehicles to determine whether the driving environment has changed. In particular, the autonomous driving computer system 144 may determine one or more trajectories for the surrounding vehicles, and then may compare these trajectories to an expected trajectory for a hypothetical vehicle. Where there are consistent differences between the determined trajectories and the expected trajectory, indicated by various types of deviation metrics, the autonomous driving computer system 144 may determine whether the driving environment has changed.

Although aspects of this disclosure have been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of this disclosure as defined by the appended claims. Furthermore, while certain operations and functions are shown in a specific order, they may be performed in a different order unless it is expressly stated otherwise.

The invention claimed is:

1. A method comprising:
receiving, by one or more processors of a first vehicle, sensor information including information about second vehicles in a driving environment of the first vehicle;
observing, by the one or more processors, a plurality of trajectories corresponding to the second vehicles based on the received sensor information, each trajectory of the plurality of trajectories corresponding to a respective path taken by each distinct vehicle of the second vehicles;
determining, by the one or more processors, whether traffic has shifted based on the plurality of trajectories; and
controlling, by the one or more processors, the first vehicle based on the determination of whether traffic has shifted.

2. The method of claim 1, wherein determining whether traffic has shifted includes monitoring a consistent change in the plurality of trajectories.

3. The method of claim 1, wherein traffic is determined to have shifted when the plurality of trajectories do not follow lanes included in a map stored at the first vehicle.

4. The method of claim 3, further comprising, prior to controlling the first vehicle based on the determination of whether traffic has shifted, determining, when traffic is determined to have shifted, that the map stored in the first vehicle is no longer accurate for controlling the first vehicle.

5. The method of claim 1, wherein controlling the first vehicle based on the determination that traffic has shifted includes retrieving an up-to-date map from a map provider server.

6. The method of claim 5, wherein the up-to-date map includes changes to the driving environment of the first vehicle.

7. The method of claim 1, wherein controlling the first vehicle based on the determination that traffic has shifted includes requesting that a passenger in the first vehicle take control of the first vehicle.

8. A system comprising one or more processors configured to:
receive sensor information including information about second vehicles in a driving environment of a first vehicle;
observe a plurality of trajectories corresponding to the second vehicles based on the received sensor information, each trajectory of the plurality of trajectories corresponding to a respective path taken by each distinct vehicle of the second vehicles;
determine whether traffic has shifted based on the plurality of trajectories; and
control the first vehicle based on the determination of whether traffic has shifted.

9. The system of claim 8, wherein determining whether traffic has shifted includes monitoring a consistent change in the plurality of trajectories.

10. The system of claim 8, wherein traffic is determined to have shifted when the plurality of trajectories do not follow lanes included in a map stored at the first vehicle.

11. The system of claim 10, wherein the one or more processors are further configured to, prior to controlling the first vehicle based on the determination of whether traffic has shifted, determine, when traffic is determined to have shifted, that the map stored in the first vehicle is no longer accurate for controlling the first vehicle.

12. The system of claim 8, wherein controlling the first vehicle based on the determination that traffic has shifted includes retrieving an up-to-date map from a map provider server.

13. The system of claim 12, wherein the up-to-date map includes changes to the driving environment of the first vehicle.

14. The system of claim 8, wherein controlling the first vehicle based on the determination that traffic has shifted includes requesting that a passenger in the first vehicle take control of the first vehicle.

15. A non-transitory, machine readable medium on which instructions are stored, the instructions, when executed by one or more processors, cause the one or more processors to perform a method comprising:
receiving sensor information including information about second vehicles in a driving environment of a first vehicle;
observing a plurality of trajectories corresponding to the second vehicles based on the received sensor information, each trajectory of the plurality of trajectories corresponding to a respective path taken by each distinct vehicle of the second vehicles;
determining whether traffic has shifted based on the plurality of trajectories; and
controlling the first vehicle based on the determination of whether traffic has shifted.

16. The medium of claim 15, wherein determining whether traffic has shifted includes monitoring a consistent change in the plurality of trajectories.

17. The medium of claim 15, wherein traffic is determined to have shifted when the plurality of trajectories do not follow lanes included in a map stored at the first vehicle.

18. The medium of claim 17, wherein the method further comprises prior to controlling the first vehicle based on the determination of whether traffic has shifted, determining, when traffic is determined to have shifted, that the map stored in the first vehicle is no longer accurate for controlling the first vehicle.

19. The medium of claim 15, wherein controlling the first vehicle based on the determination that traffic has shifted includes retrieving an up-to-date map from a map provider server.

20. The medium of claim 15, wherein controlling the first vehicle based on the determination that traffic has shifted includes requesting that a passenger in the first vehicle take control of the first vehicle.

* * * * *